United States Patent
Xin et al.

(10) Patent No.: US 11,516,848 B2
(45) Date of Patent: Nov. 29, 2022

(54) CHANNEL CONTENTION OF NON-STR MLD WHEN DETECTING TRANSMISSION ON ONE LINK

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 56 days.

(21) Appl. No.: 17/233,305

(22) Filed: Apr. 16, 2021

(65) Prior Publication Data

US 2022/0086906 A1    Mar. 17, 2022

Related U.S. Application Data

(60) Provisional application No. 63/078,854, filed on Sep. 15, 2020.

(51) Int. Cl.
*H04W 24/08* (2009.01)
*H04W 74/08* (2009.01)

(52) U.S. Cl.
CPC ....... *H04W 74/0816* (2013.01); *H04W 24/08* (2013.01)

(58) Field of Classification Search
CPC ............. H04W 74/0816; H04W 24/08; H04L 5/0062; H04L 27/0006
See application file for complete search history.

(56) References Cited

U.S. PATENT DOCUMENTS

| 2018/0152960 | A1 | 5/2018 | Kim | |
|---|---|---|---|---|
| 2018/0288706 | A1* | 10/2018 | Fang | H04L 27/2603 |
| 2020/0383156 | A1* | 12/2020 | Seok | H04W 76/15 |
| 2021/0084711 | A1* | 3/2021 | Park | H04W 74/0816 |
| 2021/0160941 | A1* | 5/2021 | Patil | H04L 1/1614 |

FOREIGN PATENT DOCUMENTS

WO    2015088197 A1    6/2015

OTHER PUBLICATIONS

Khorov, Evgeny et al., "Current Status and Directions of IEEE 802.11be, the Future Wi-Fi 7," in IEEE Access, vol. 8, pp. 88664-88688, 2020, doi: 10.1109/ACCESS.2020.2993448, published May 8, 2020, downloaded from https://ieeexplore.ieee.org/document/9090146.

Akhmetov, Dmitry et al., Discussion on methods for synchronous ML operations, IEEE Doc.: 802.11-20/993r1, Aug. 2020, 23 page PowerPoint slide deck, downloaded from https://mentor.ieee.org/802.11/dcn/20/11-20-0993-01-00be-sync-ml-operations-of-non-str-device.pptx.

* cited by examiner

*Primary Examiner* — Hassan Kizou
*Assistant Examiner* — Hector Reyes
(74) *Attorney, Agent, or Firm* — O'Banion & Ritchey LLP; John P. O'Banion

(57) ABSTRACT

Multiple solutions for a non-STR (simultaneous transmit and receive) MLD (Multi-Link Device) contending and accessing the channel on a second link, during the detection time of the packet transmission on a first link. The solutions involve performing select backoff count-down procedures, channel accessing, and backoff initialization/re-initialization that the non-STR MLD should perform on the second link during its detection time on the first link.

20 Claims, 34 Drawing Sheets

FIG. 2 (Prior Art)

Data frame: Frame Control | Duration | RA | TA | Sequence Control | Data | FCS

FIG. 3 (Prior Art)

ACK frame: Frame Control | Duration | RA | FCS

FIG. 4 (Prior Art)

HE-SU: L-STF (8μs) | L-LTF (8μs) | L-SIG (4μs) | RL-SIG (4μs) | HE-SIG-A (8μs) | HE-STF (4μs) | HE-LTFs | Data | PE

HE-MU

| L-STF | L-LTF | L-SIG | RL-SIG | HE-SIG-A | HE-SIG-B | HE-STF | HE-LTFs | Data | PE |
|---|---|---|---|---|---|---|---|---|---|
| 8μs | 8μs | 4μs | 4μs | 8μs | 16μs | 4μs | | | |

| L-STF | L-LTF | L-SIG | RL-SIG | HE-SIG-A | HE-STF | HE-LTFs | Data | PE |
|---|---|---|---|---|---|---|---|---|
| 8μs | 8μs | 4μs | 4μs | 8μs | 8μs | | | |

**FIG. 8
(Prior Art)**

Trigger frame

| Frame Control | Duration | RA | TA | Common Info | User Info | ... | User Info | FCS |
|---|---|---|---|---|---|---|---|---|

**FIG. 9
(Prior Art)**

Common Info

| Trigger Type | Length | Cascading Indication | CS Required | BW | GI And LTF Type | MU MIMO LTF Mode | Number of HE-LTF Symbols | STBC |
|---|---|---|---|---|---|---|---|---|
| LDPC Extra Symbol Segment | AP TX Power | Packet Extension | Spatial Reuse | Doppler | GI And LTF Type | HE-SIG-A Reserved | Reserved | Trigger dependent common info |

FIG. 10 (Prior Art)

User Info Field

| AID12 | RU Allocation | Coding Type | MCS | DCM | SS Allocation | Target RSSI | Reserved | Trigger dependent user info |
|---|---|---|---|---|---|---|---|---|

FIG. 11 (Prior Art)

MU-BAR variant

| BAR control | BAR info |
|---|---|

FIG. 12 (Prior Art)

BA frame

| Frame Control | Duration | RA | TA | BA control | BA info | FCS |
|---|---|---|---|---|---|---|

FIG. 13 (Prior Art)

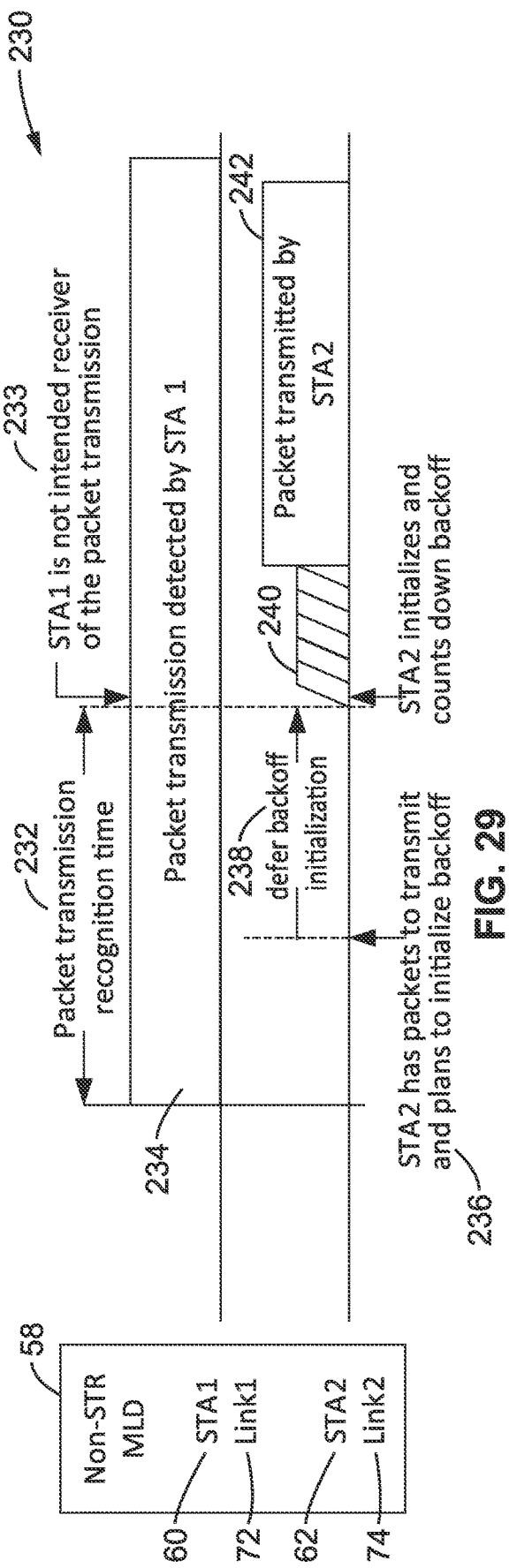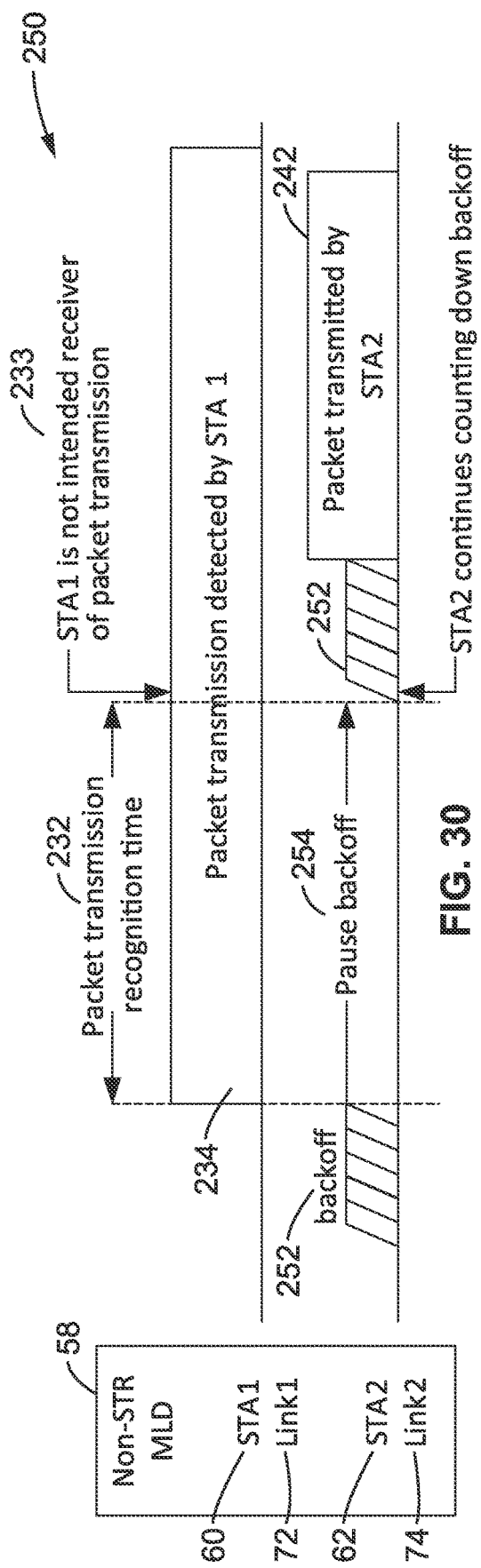

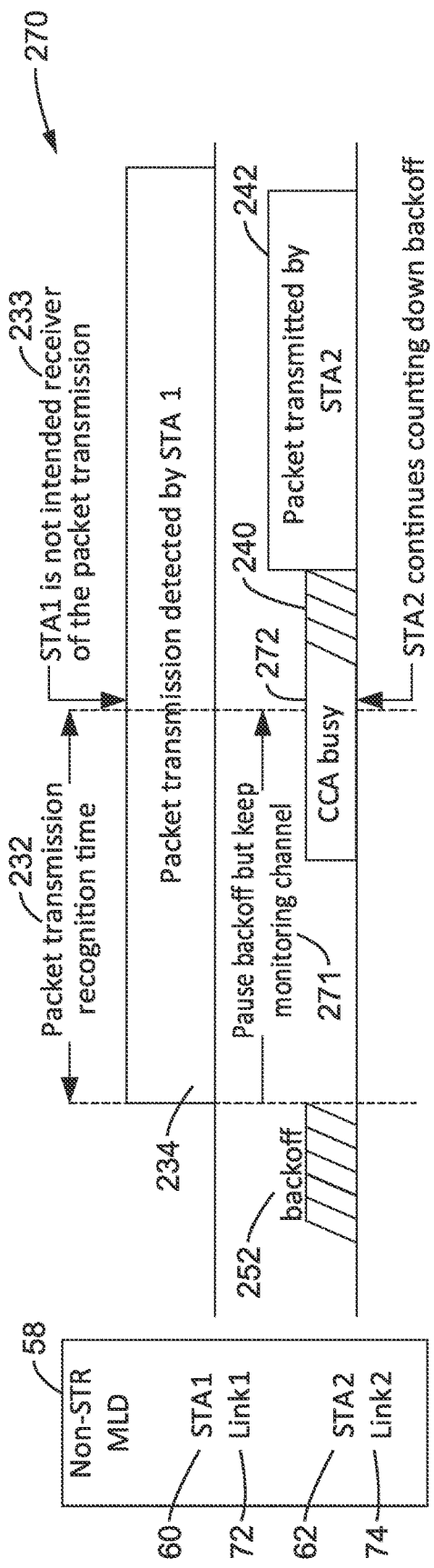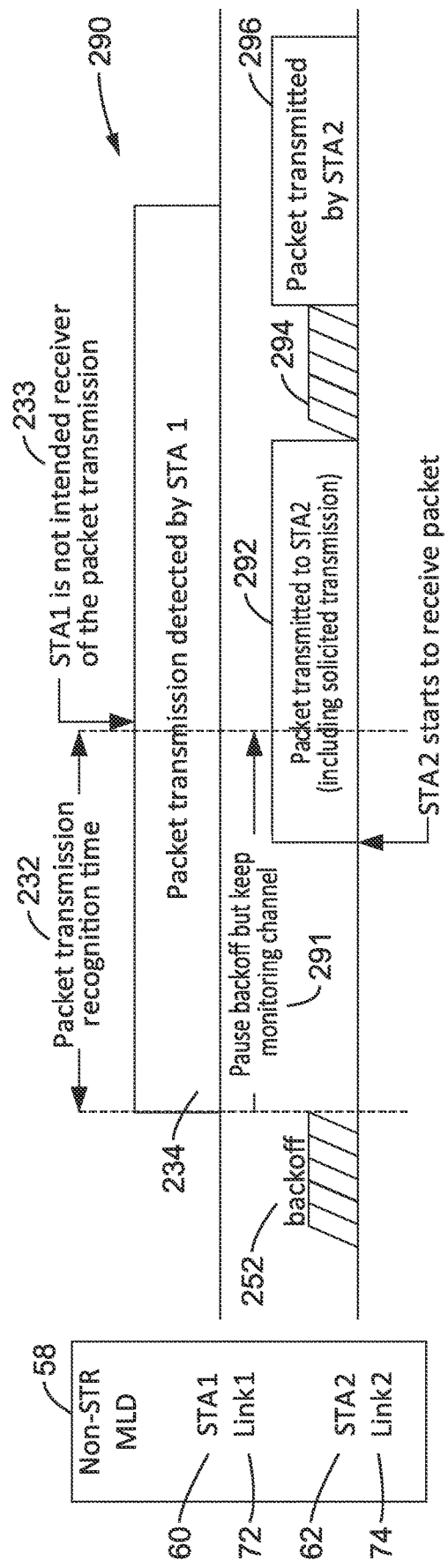

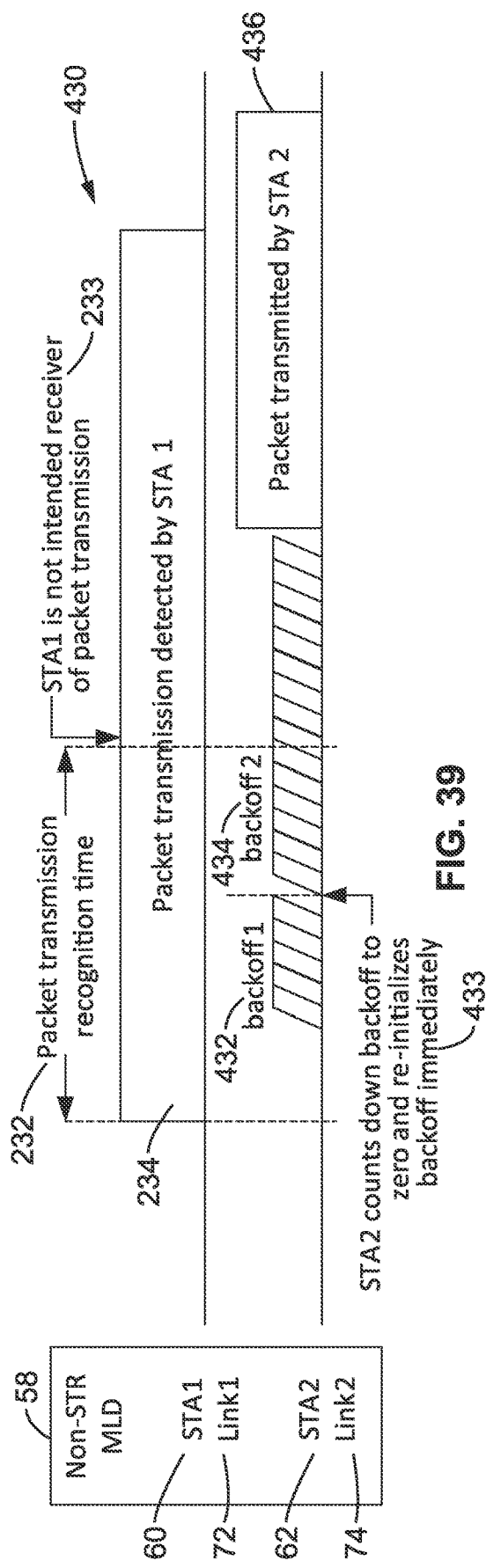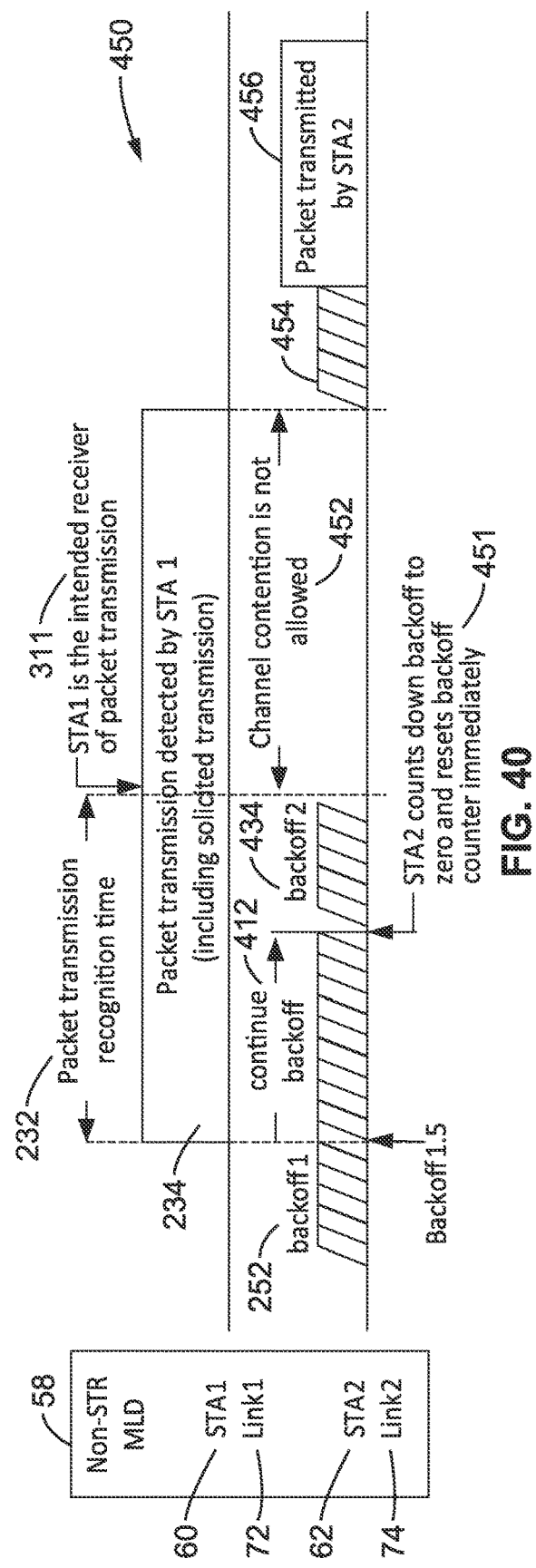

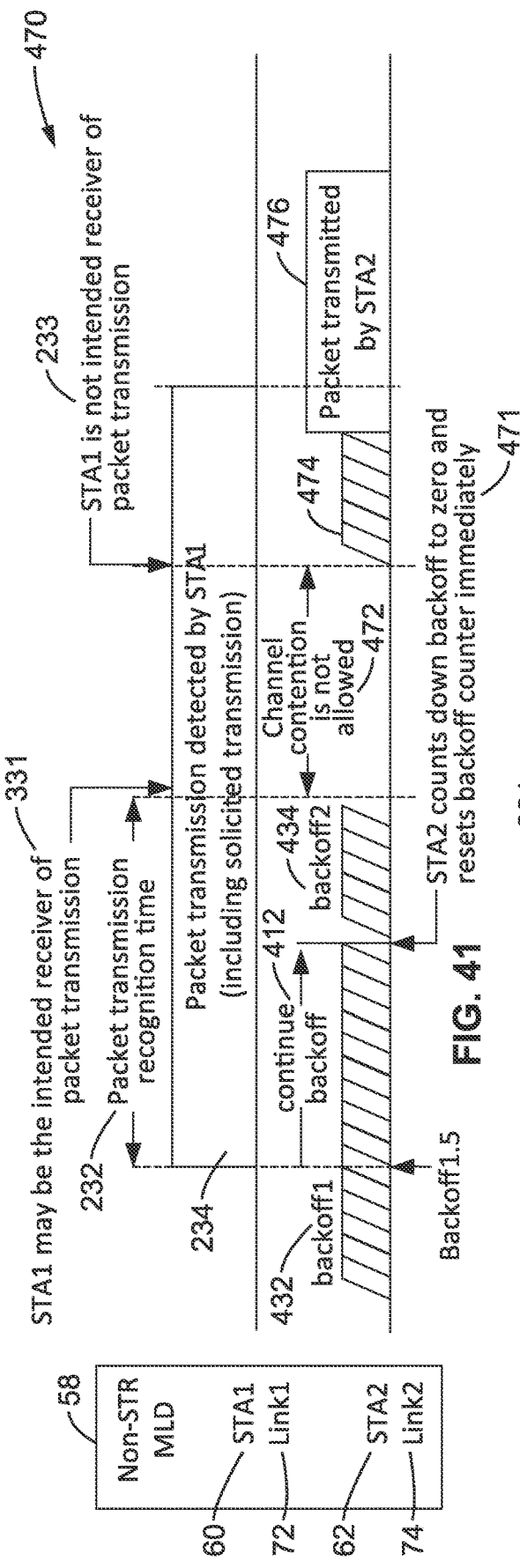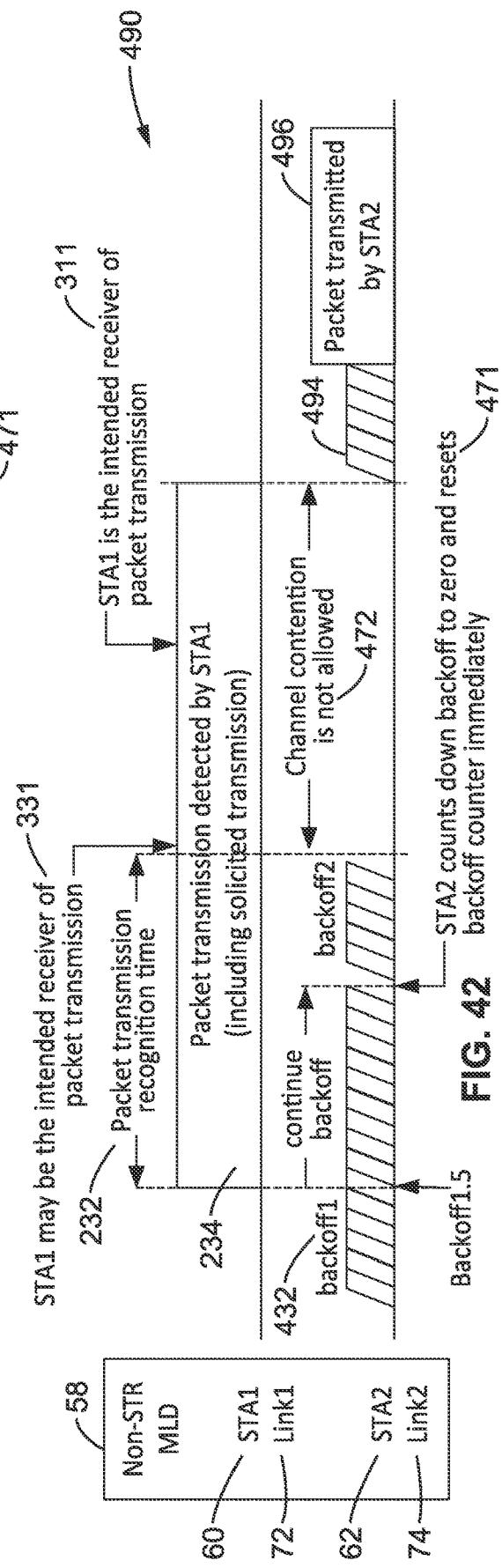
FIG. 41
FIG. 42

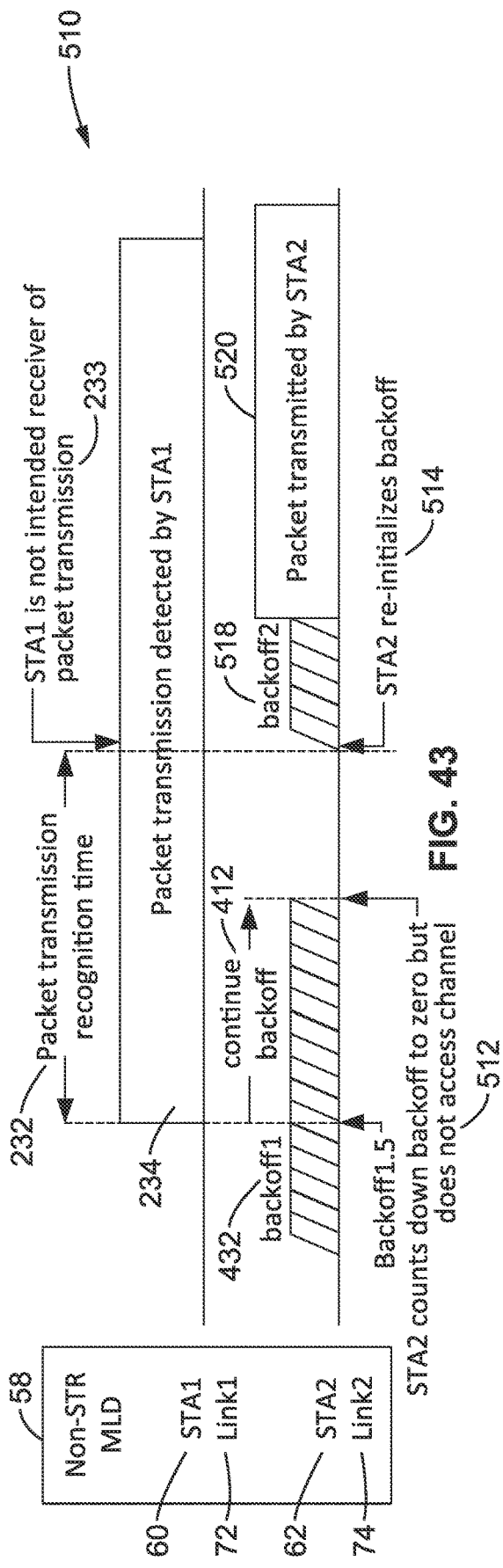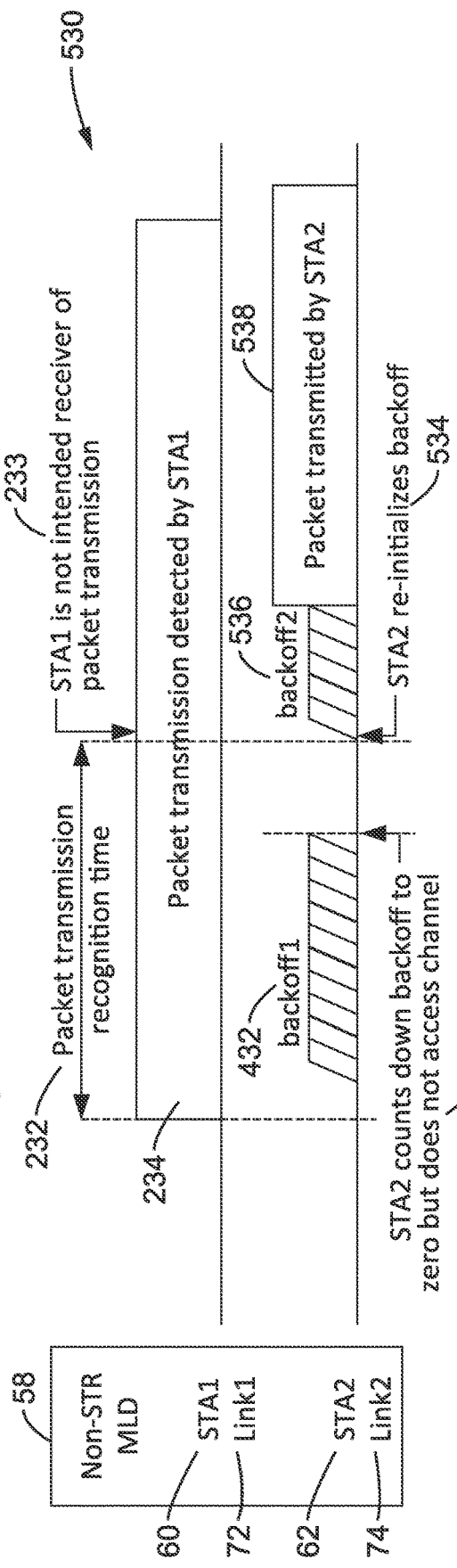

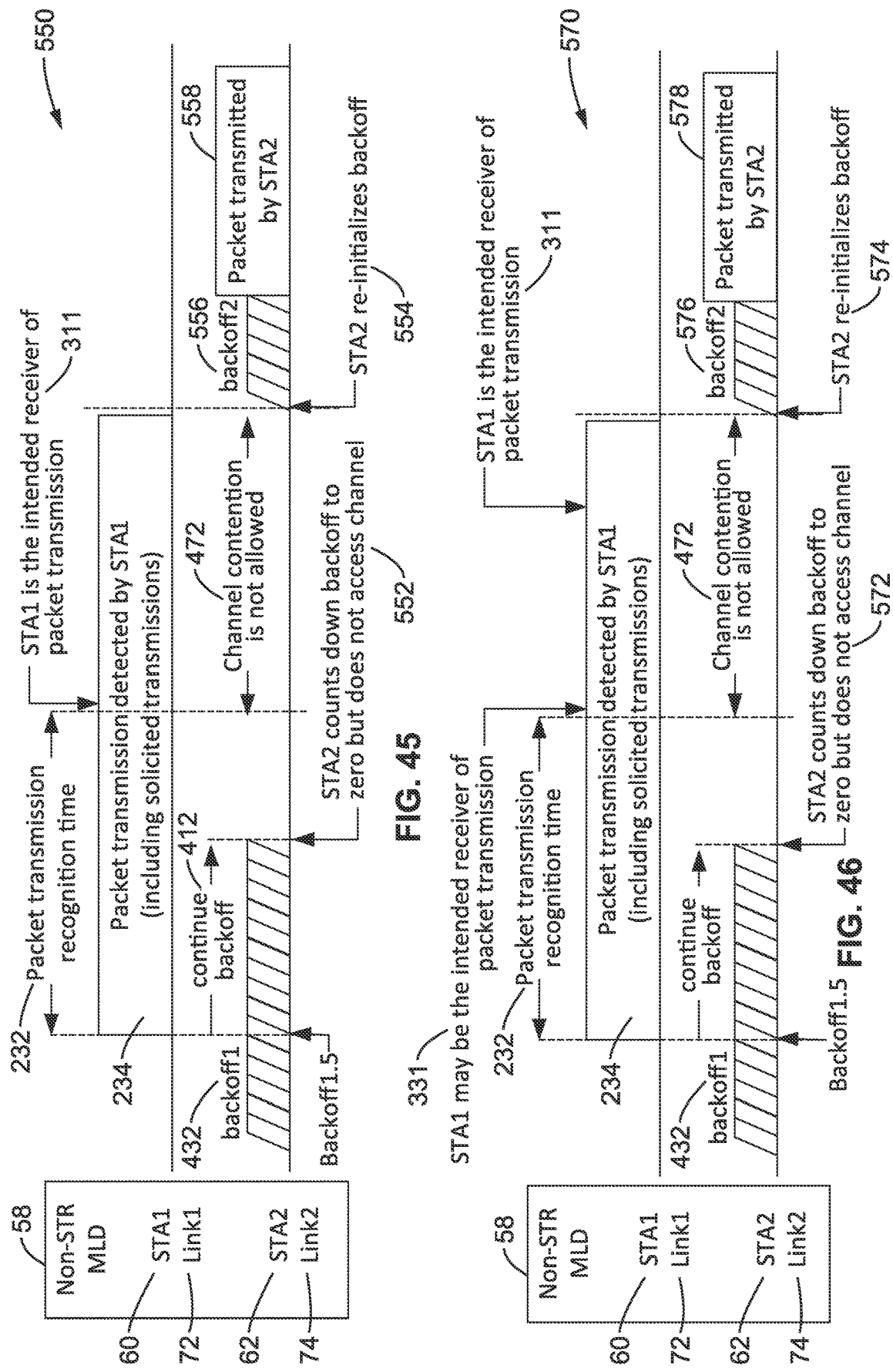

CHANNEL CONTENTION OF NON-STR MLD WHEN DETECTING TRANSMISSION ON ONE LINK

CROSS-REFERENCE TO RELATED APPLICATIONS

This application claims priority to, and the benefit of, U.S. provisional patent application Ser. No. 63/078,854 filed on Sep. 15, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication systems (WLANs), and more particularly to WLANs using CSMA/CA in which a non-STR (non-Simultaneous Transmit and Receive) MLD (Multi-Link Device) MLD contends and accesses a channel on a second link during the detection time on a first link.

2. Background Discussion

Current wireless communication systems allow more than one station (STA) to be affiliated with a device; for example in a Multi-Link Device (MLD). If all the affiliated STAs of a MLD are APs, then this MLD is called an AP MLD. If all the affiliated STAs of a MLD are non-APs, then this MLD is called a non-AP MLD.

When a STA of a non-AP MLD sets up communications with a STA of an AP MLD over a channel or band, as denoted by a link, they can exchange packets over that link. Every STA affiliated with the same MLD uses a link of a different frequency band.

A MLD can be considered to be configured for Simultaneous Transmit and Receive (STR) when it is able to transmit on one link while receiving on another link simultaneously. A MLD is considered non-STR is not able to transmit on one link while receiving on another link simultaneously. This constraint of non-STR MLDs is caused by the in-device coexistence interference between the STAs affiliated with the MLD.

Without any loss of generality, let us assume the AP MLD is STR and non-AP MLD is non-STR. Due to the constraints of a non-STR non-AP MLD, there are challenges for a STR AP MLD contending for the channel to obtain access on multiple links and reserve TXOPs with non-STR non-AP MLDs.

Accordingly, a need exists for a properly accessing links on an MLD having non-STR stations. The present disclosure fulfills that need and provides additional benefits over previous technologies.

BRIEF SUMMARY

A wireless communications protocol for operating on a network with a multi-link device (MLD) controlling multiple links for wirelessly communicating with at least one other station or other MLD on a network using Carrier-Sense Multiple-Access Collision Avoidance (CSMA/CA) and in which multi-link operations are performed. The present disclosure addresses the case when a MLD receiving on a first link and being interfered with by transmission on a second link, requires packet transmission recognition time to determine whether it is the intended receiver of the packet transmission detected on the first link. Different modes/embodiments are described in which the MLD handles contention during the recognition time of a packet, contention for the channel depending on whether the station of the MLD is the intended receiver of the packet, and whether and how it afterward sets a backoff and contends for channel access.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2 is a data field diagram of a Data frame format in a regular WLAN system.

FIG. 3 is a data field diagram of an ACK frame format in a regular WLAN system.

FIG. 4 is a data field diagram of an HE-SU PPDU frame format in IEEE 802.11ax.

FIG. 7 is a data field diagram of an HE-MU PPDU frame format in IEEE 802.11ax.

FIG. 8 is a data field diagram of an HE-TB PPDU frame format in IEEE 802.11ax.

FIG. 9 is a data field diagram of a Trigger frame format in IEEE 802.11ax.

FIG. 10 is a data field diagram of a Common information field in the trigger frame shown in FIG. 9.

FIG. 11 is a data field diagram of a User information field in trigger frame in the trigger frame shown in FIG. 9.

FIG. 12 is a data field diagram of a Trigger dependent user info field in the trigger frame as seen in FIG. 11 for the MU-BAR.

FIG. 13 is a data field diagram of a Block ACK (BA) frame format in regular WLAN systems.

FIG. 29 is a communications sequence diagram with an example of a non-STR MLD deferring backoff initialization on Link2 during the recognition time on Link1 according to at least one embodiment of the present disclosure.

FIG. 30 is a communications sequence diagram with a first example of a non-STR MLD pausing backoff on Link2 during the recognition time on Link1 according to at least one embodiment of the present disclosure.

FIG. 31 is a communications sequence diagram with a second example of a non-STR MLD pausing backoff on Link2 during the recognition time on Link1 according to at least one embodiment of the present disclosure.

FIG. 32 is a communications sequence diagram with a third example of a non-STR MLD pausing backoff on Link2 during the recognition time on Link1 according to at least one embodiment of the present disclosure.

FIG. 39 is a communications sequence diagram with a second example of a non-STR MLD re-initializing backoff immediately on Link2 when backoff counts down to zero on Link2 during the recognition time on Link1 according to at least one embodiment of the present disclosure.

FIG. 40 is a communications sequence diagram with a third example of a non-STR MLD re-initializing backoff immediately on Link2 when backoff counts down to zero on Link2 according to at least one embodiment of the present disclosure.

FIG. 41 is a communications sequence diagram with a fourth example of a non-STR MLD re-initializing backoff immediately on Link2 when backoff counts down to zero on Link2 according to at least one embodiment of the present disclosure.

FIG. 42 is a communications sequence diagram with a fifth example of a non-STR MLD re-initializing backoff immediately on Link2 when backoff counts down to zero on Link2 according to at least one embodiment of the present disclosure.

FIG. 43 is a communications sequence diagram with a first example of a non-STR MLD deferring backoff re-initialization on Link2 when backoff counts down to zero on Link2 during the recognition time on Link1 according to at least one embodiment of the present disclosure.

FIG. 44 is a communications sequence diagram with a second example of non-STR MLD deferring backoff re-initialization on Link2 when backoff counts down to zero on Link2 during the packet transmission recognition time on Link1 according to at least one embodiment of the present disclosure.

FIG. 45 is a communications sequence diagram with a third example of non-STR MLD deferring backoff re-initialization on Link2 when backoff counts down to zero on Link2 during the packet transmission recognition time on Link1 according to at least one embodiment of the present disclosure.

FIG. 46 is a communications sequence diagram with a fourth example of a non-STR MLD deferring backoff re-initialization on Link2 when backoff counts down to zero on Link2 during the packet transmission recognition time on Link1 according to at least one embodiment of the present disclosure.

DETAILED DESCRIPTION

1. WLAN Systems Under IEEE 802.11

1.1. CSMA/CA Systems

In WLAN systems, IEEE 802.11 uses CSMA/CA to allow stations (STAs) to obtain access to the channel for packet transmission and retransmission.

Figure 1:
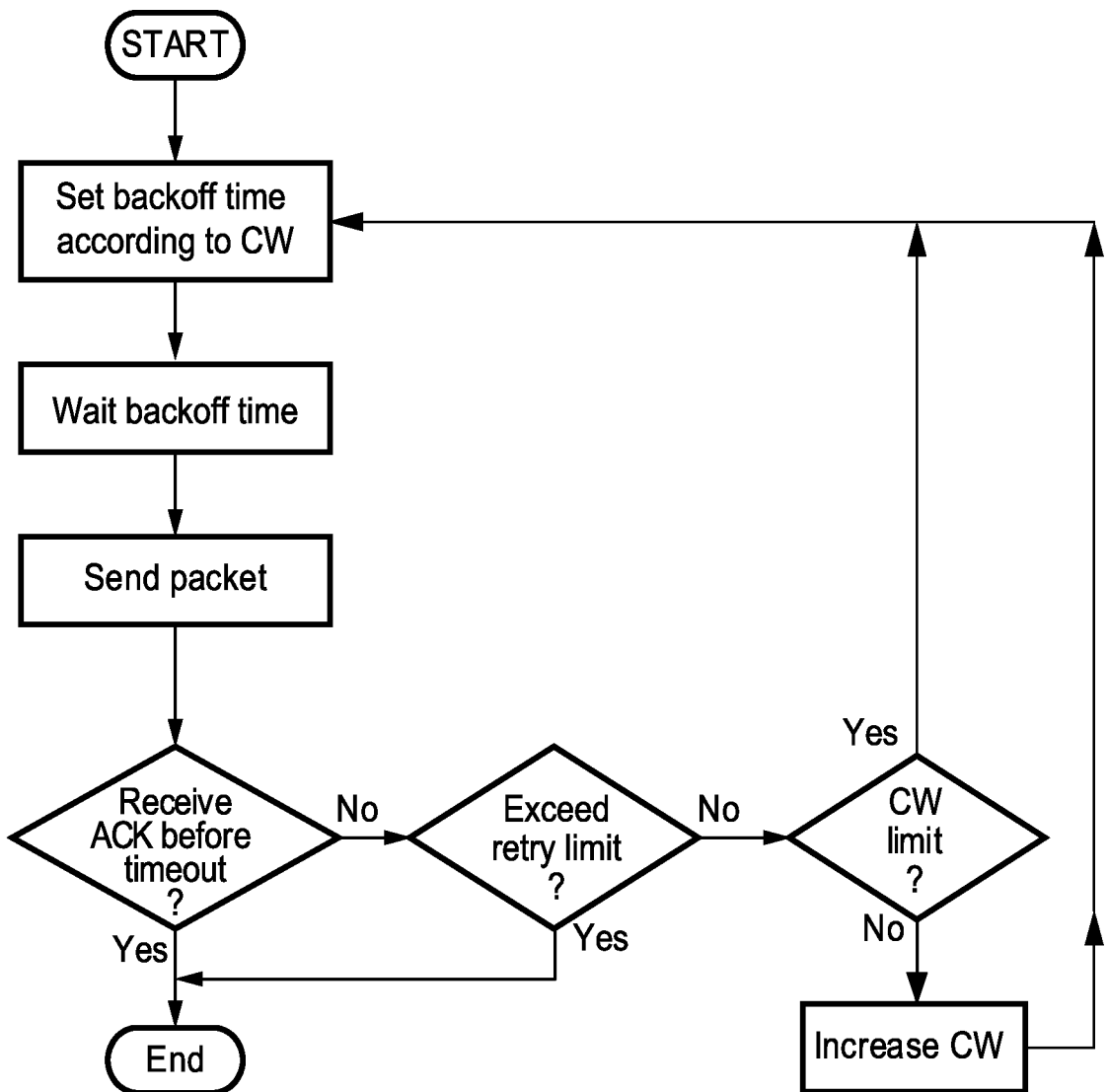
FIG. 1 is a flow diagram of a retransmission scheme in CSMA/CA under IEEE 802.11.

FIG. 1 depicts a flow diagram of this process. In CSMA/CA systems, before each transmission and retransmission, the STA has to sense channel status and set a backoff time to contend for channel access. The backoff time is decided by a uniform random variable between 0 and the Contention Window (CW) size. After the STA waits for the backoff time and senses that the channel is idle, then the STA may send a packet.

If an Acknowledgement (ACK) for the transmission is received, then the transmission succeeded. Otherwise, retransmission of that packet is required; since the STA did not receive an ACK for packet transmission before the timeout occurred. When retransmission is required, the STA checks the number of retransmissions which have been performed for the packet. If the number of retransmission attempts exceeds the retry limit, then the packet is dropped and no retransmission is scheduled. Otherwise, the retransmission is scheduled.

If retransmission is scheduled, then another backoff time is needed to contend for retransmission channel access. If the size of the contention window has not reached the upper limit, the STA increases it.

The STA sets another backoff time depending on the new size of the contention window. The STA waits for the backoff time period for checking channel status and performing its retransmission and proceeds accordingly.

FIG. 2 illustrates a data frame format in a regular WLAN system, having the following fields. A Frame Control field indicates the type of frame. A Duration field contains NAV information used for CSMA/CA channel access. An RA field contains the address of the recipient of the frame. A TA field contains the address of the STA that transmitted the frame. A Sequence control field contains the fragment number and the sequence number of the packet. A data field contains the data payload of the frame. A frame check sequence (FCS) is also shown here and in other data structures described herein. FCS is an error-detecting code added to a frame in a communications protocol, when communicating data from a source to a destination; and may be shown in many of the frames of the present disclosure.

FIG. 3 illustrates an Acknowledgement (ACK) frame format in a regular WLAN system having the following fields. A Frame Control field indicates the type of frame. A Duration field contains NAV information used for CSMA/CA channel access. An RA field contains the address of the recipient of the frame.

FIG. 4 depicts a High-Efficiency (HE) Single-User (SU) Physical-layer Protocol Data Unit (PPDU) format used for SU transmission in IEEE 802.11ax; which contains the following fields.

An L-STF field is a non-HT short training field. An L-LTF field is a non-HT long training field. An L-SIG field is a non-HT SIGNAL field. An RL-SIG field is a repeated non-HT SIGNAL field. An HE-SIG-A field is a HE SIGNAL A field. An HE-STF field is a HE short training field. An HE-LTF field is a HE long training field. A Data field is a field carrying the data as PSDUs. A PE field is a packet extension field.

Figure 5:
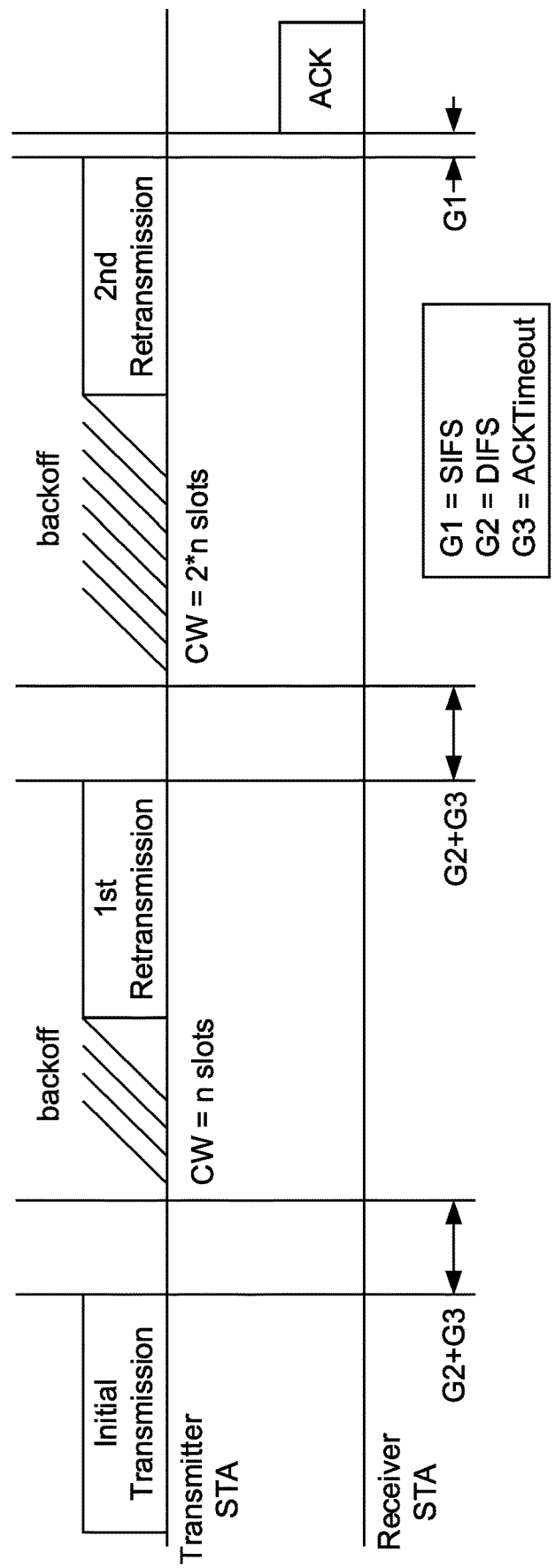
FIG. 5 is a communications sequence diagram of a double sized contention window when performing a retransmission in CSMA/CA.

FIG. 5 illustrates one example of the retransmission in CSMA/CA where the backoff time is increased due to retransmission. The data frame and the ACK frame use the formats as shown in FIG. 2 and FIG. 3, respectively. The frames are packetized using the packet format as shown in FIG. 4. In this example, after the transmitter transmits the initial transmission of a packet it does not receive the ACK before timeout. So, it sets another backoff time for a first retransmission, whereby the size of the contention window is n slots. After waiting the backoff time, the transmitter STA retransmits the packet for the first time. However, the retransmission also fails. The transmitter STA needs to retransmit the packet and again sets a backoff time to contend for channel access. This time, the size of the contention window is 2*n slots, due to the retransmission. The expected backoff time is also doubled by the contention window size. The 2nd retransmission succeeds since it receives an ACK before timeout.

Figure 6:
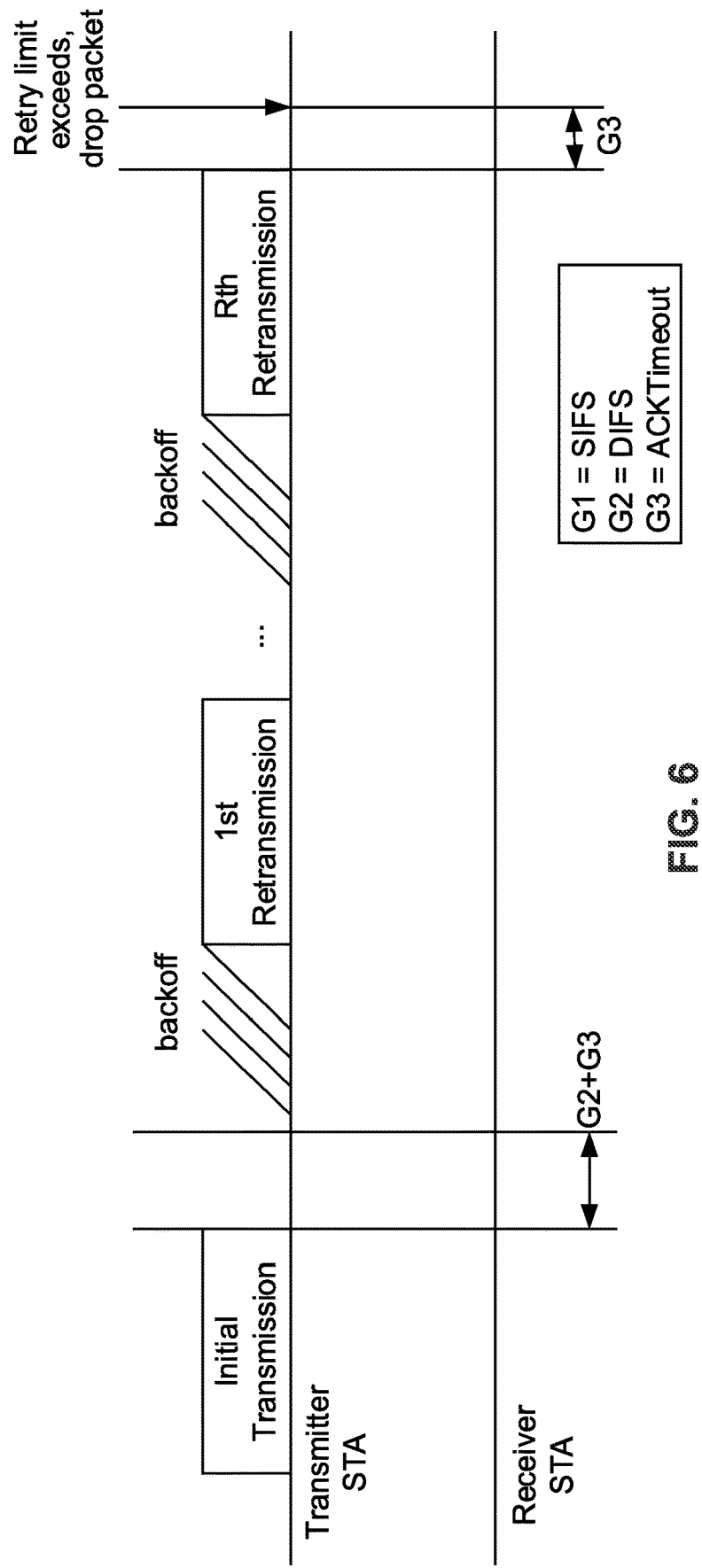
FIG. 6 is a communications sequence diagram showing a packet being dropped due to reaching the retry limit under CSMA/CA.

FIG. 6 illustrates one example in which the packet is dropped after the number of retransmissions exceeds the retry limit. Let us denote the retry limit by R. The data frame and the ACK frame use the formats as shown in FIG. 2 and FIG. 3, respectively. The frames are packetized using the packet format as shown in FIG. 4. As shown in FIG. 6, after the initial transmission of a packet fails, the transmitter STA retransmits that packet multiple times. However, none of the retransmissions succeed. After retransmitting R times, the number of retransmissions exceeds the retry limit, whereby the transmitter STA stops retransmitting the packet and that packet is dropped.

1.2. Multi-User Transmission

Multi-user transmission is available in wireless networks, such as IEEE 802.11. Since IEEE 802.11ax, the network has supported multi-user transmission in both uplink and downlink directions. Multi-user transmission in IEEE 802.11ax includes Multiple-Input Multiple-Output (MIMO) mode and Orthogonal Frequency-Division Multiple Access (OFDMA) mode, which may be utilized either separately or together.

IEEE 802.11ax uses Multi-User (MU) transmission packet formats, such as depicted in FIG. 2 and FIG. 3, to transmit data in multi-user mode. When multiple users transmit or receive a multi-user transmission packet, all the users share the same Physical Layer Convergence Procedure (PLCP) header of the multi-user transmission packet. Then, each user transmits or receives the data carried by the multi-user transmission packet using a separate resource block, including Resource Unit (RU) allocation, Modulation and Coding Scheme (MCS) and so forth.

IEEE 802.11ax defines multiple Physical Layer Protocol Data Units (PPDUs); each PPDU is formatted to transmit packets in a different multi-user transmission scenario, and are listed as follows.

FIG. 7 depicts an HE multi-user (MU) PPDU format used for Downlink (DL) multi-user transmission. Compared with a single user PPDU format as shown in FIG. 4, it adds the HE-SIG-B field into its format, which provides the separate resource block allocation information to each user.

FIG. 8 shows the HE Trigger-based (TB) PPDU format used for Uplink (UL) multi-user transmission. The fields in the HE TB PPDU format are identical to those in the HE single user PPDU format, except that the HE-STF field length is 8 μs.

FIG. 9 depicts the content of a trigger frame having the following fields. A Frame Control field indicates the type of frame. A Duration field contains NAV information used for CSMA/CA channel access. An RA field contains the address for the recipient of the frame. A TA field contains the address of the STA which transmitted the frame. A Common Info field includes the information for all allocated STAs, and a user info field are shown. The Common Info field and the User Info field provide the separate resource block allocation information to each user.

FIG. 10 depicts subfields of the Common Info field seen in FIG. 9.

FIG. 11 depicts subfields the User Info field seen in FIG. 9, including information for each STA.

It should be noted that the trigger frame as shown in FIG. 9 can be transmitted as a multi-user block ACK request (MU-BAR) by setting the trigger type in the common info field to provide this indication, for example setting it to "2" as per the described embodiments.

FIG. 12 depicts a MU-BAR variant of the trigger frame when the trigger frame is MU-BAR, within the content of the trigger dependent user info field as shown in FIG. 10.

FIG. 13 shows the content of the block ACK frame having the following fields. A Frame Control field indicates the type of frame. A Duration field contains NAV information used for CSMA/CA channel access. An RA field contains the address for the recipient of the frame. A TA field contains the address of the STA which transmitted the frame. A Block Acknowledge (BA) Control field indicates the policy of the block ACK. A BA info field contains feedback of the transmission.

Figure 14:
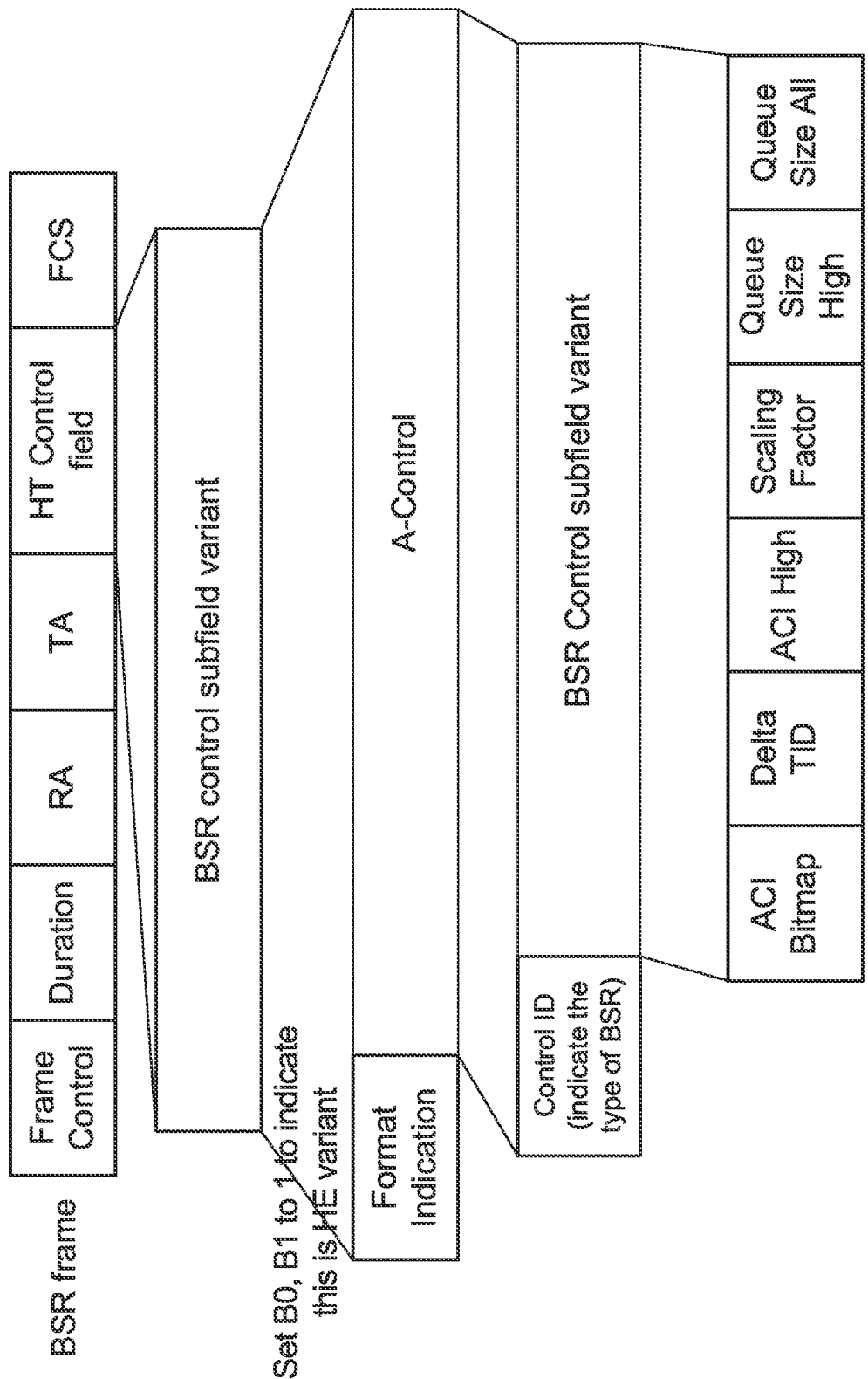
FIG. 14 is a data field diagram of a Buffer Status Report (BSR) frame format.

FIG. 14 depicts the content of the Buffer Status Report (BSR) frame having the following fields. A Frame Control field indicates the type of frame. A Duration field contains NAV information used for CSMA/CA channel access. An RA field contains an address for the recipient of the frame. A TA field contains the address of the STA that transmitted the frame. An HT Control field indicates the BSR control subfield variant. A Format Indication is a field used to indicate the format of the HT control field. When bits B0 and B1 therein are set to 1, this indicates that the HT control field uses the HE format. There is an A-Control field followed by this field. An A-Control field is a field which carries the buffer status report. A Control ID field indicates that the BSR is carried in the control information field. A Control Information field carries the BSR control subfield variant. An ACI Bitmap field indicates the access categories for which the buffer status is reported. A Delta TID field indicates the number of TIDs for which buffer status is reported. An ACI High field indicates the access category which is reported in the Queue Size High field. A Scaling Factor field indicates the units which are used by Queue Size High and Queue Size All fields. A Queue Size High field indicates the queue size of the Access Category (AC) indicated in ACI High in units of the Scaling Factor. A Queue Size All field indicates the queue size of the ACs indicated in the ACI Bitmap in units of the Scaling Factor.

Figure 15:
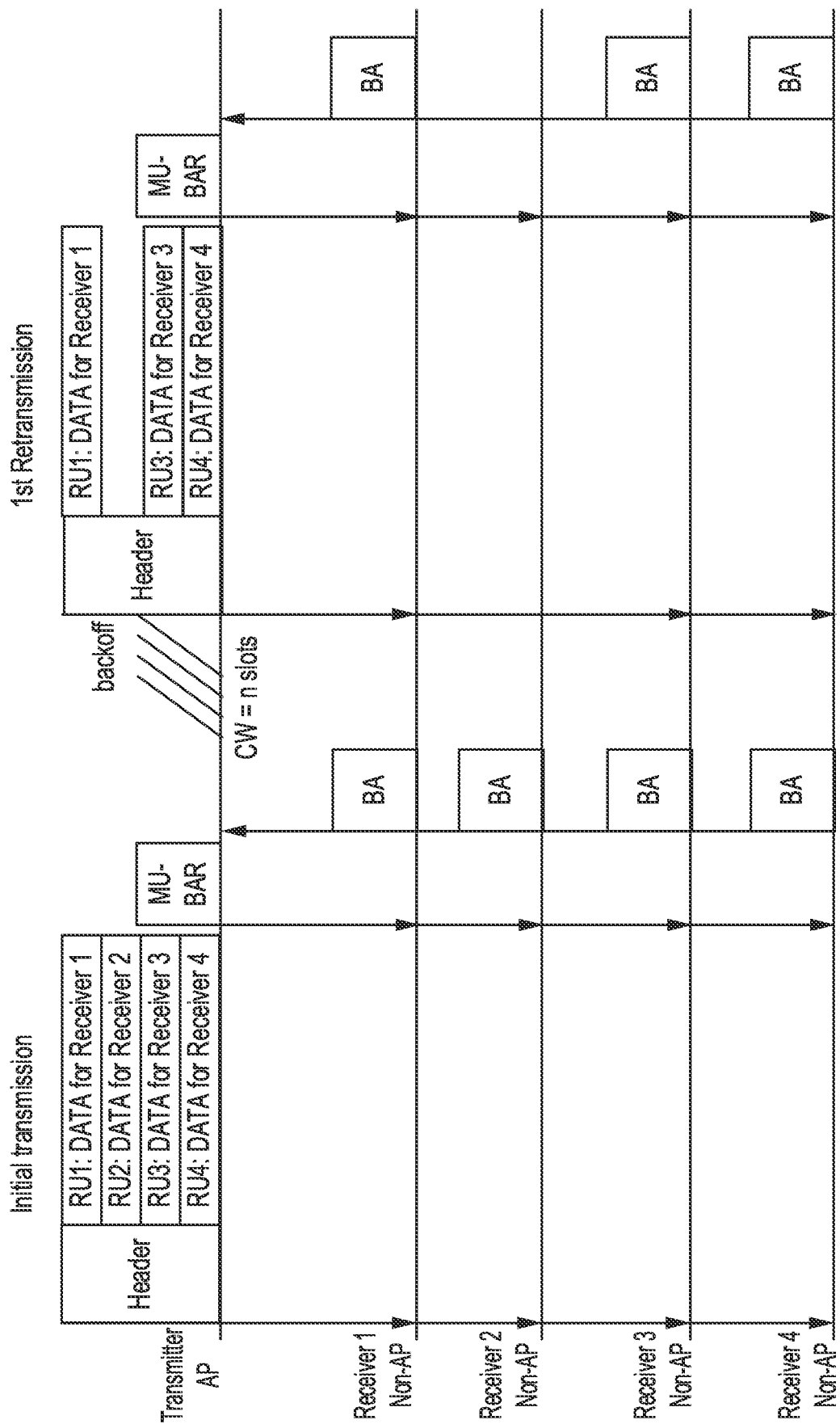
FIG. 15 is a communications sequence diagram of a CSMA/CA retransmission scheme in the downlink of OFDMA systems.

FIG. 15 depicts an example of downlink (DL) multi-user (MU) transmission using Orthogonal Frequency Division Multiple Access (OFDMA). The transmitter AP transmits data to its receivers 1, 2, 3, and 4 using the HE MU PPDU format. After finishing the initial transmission, the AP sends a multi-user Block ACK request (MU-BAR) to all the receivers. The receivers then send block ACK (BA) back to the AP. According to the content in the BAs, the AP decides to retransmit the packets to receiver 1, 3 and 4. It contends for the channel, waiting for the backoff time. The first retransmission occurs after the AP gains channel access.

Figure 16:
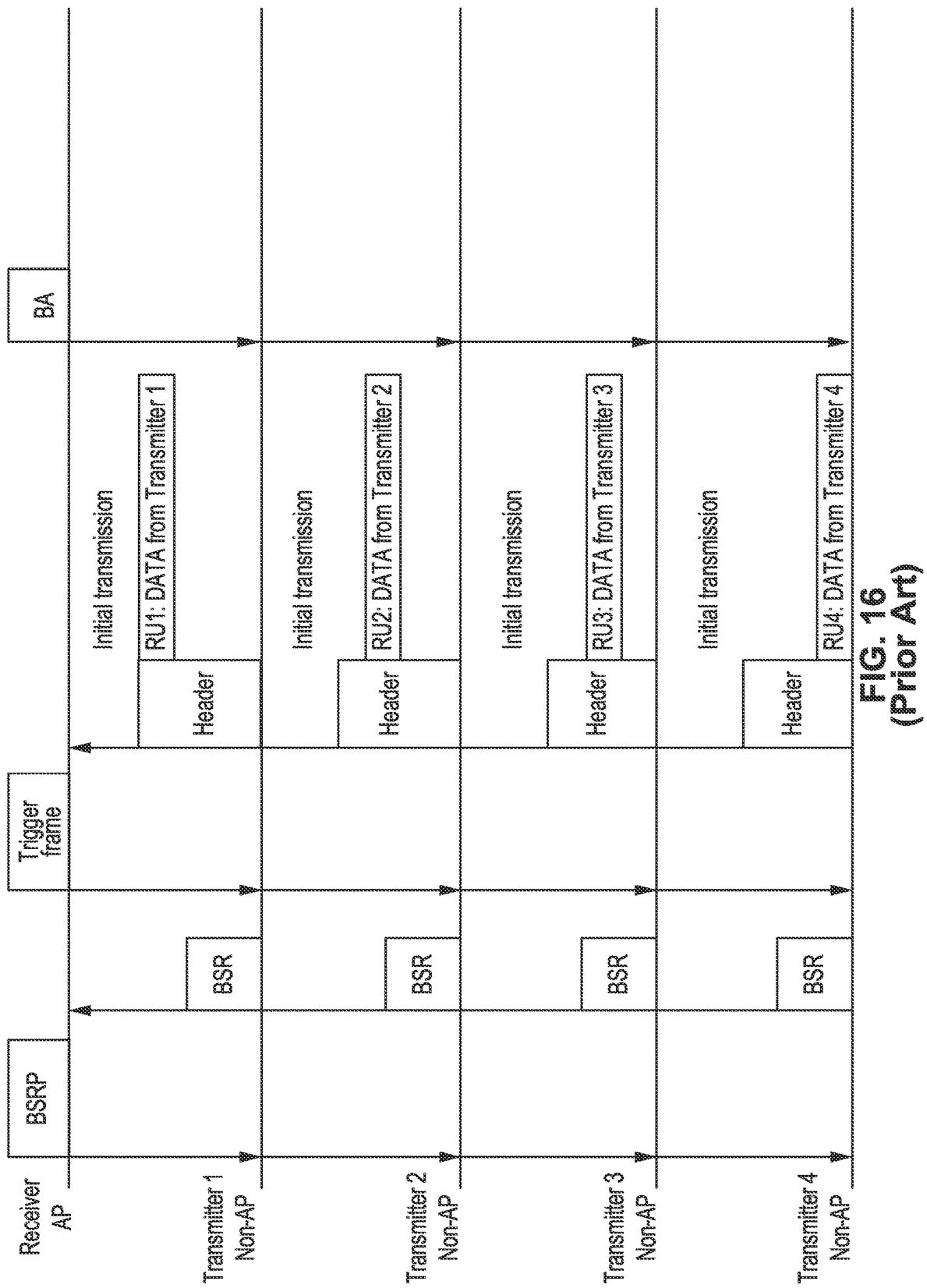
FIG. 16 is a communications sequence diagram of a CSMA/CA retransmission scheme in the uplink of OFDMA systems.

FIG. 16 depicts an example of an uplink (UL) multi-user (MU) transmission using OFDMA. The AP first sends a buffer status report request (BSRP) trigger frame to all the transmitters 1, 2, 3 and 4. Then the transmitters receive the BSRP trigger frame and send their buffer status reports (BSRs) back to the AP. Then, the AP sends a trigger frame to all the transmitters 1, 2, 3 and 4. The channel resources allocated in the trigger frame are based on the BSRs received from the STAs. The transmitters receive the trigger frame and start the initial transmission using the resource block allocated by the trigger frame. The multi-user transmission packet uses the HE-TB PPDU format. The AP receives the packet from the transmitters and sends a BA frame to report that the transmission was properly received.

3.3. EDCA System

Figure 17:
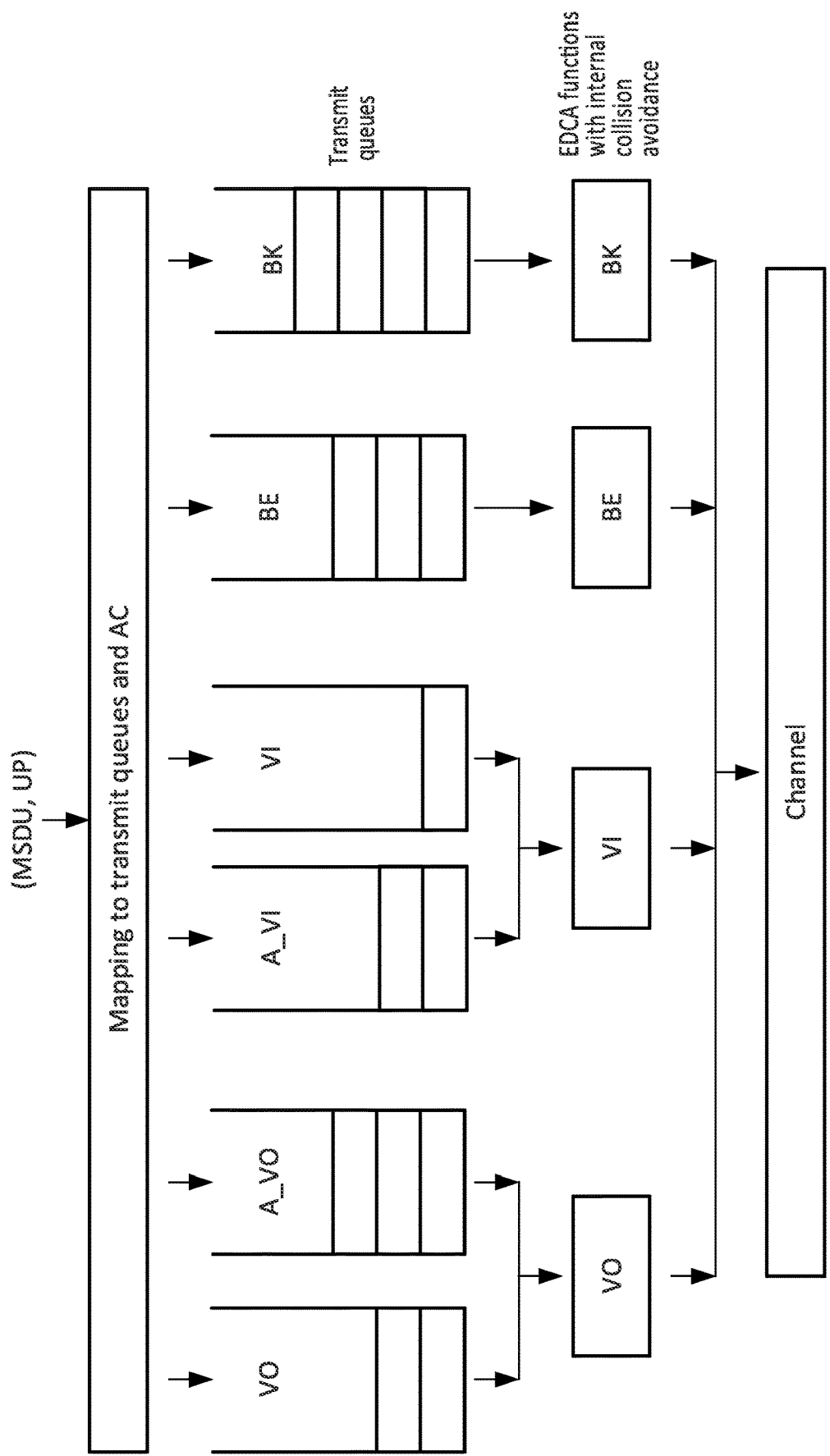
FIG. 17 is a queue structure diagram of an EDCA queue system.

FIG. 17 illustrates the reference model of the Enhanced DCF Channel Access (EDCA) queue system in IEEE 802.11. The system contains six transmit queues associated with four different access categories (ACs). Each AC uses EDCA functions (EDCAFs) to contend for channel access for transmitting packets in its corresponding transmit queues.

The six transmit queues are voice (VO), alternate voice (A_VO), alternate video (A_VI), video (VI), best effort (BE), and background (BK). Each transmit queue decides the transmission order of the packets in the queue.

The four ACs are voice (VO), video (VI), best effort (BE), and background (BK). Each of the ACs has an associated EDCA function (EDCAF) to provide the function of channel contention. An internal collision avoidance mechanism is used when multiple EDCAFs try to access the channel at the same time. When an internal collision occurs, the EDCAF with higher priority gains channel access.

Table 1 lists the User Priority (UP) to Access Category (AC) mapping used in EDCA queue of IEEE 802.11. The second and third columns represent the user priorities of the traffic and their corresponding designations in IEEE 802.1D. In each row, according to the user priority, the traffic will be enqueued in the corresponding transmit queue and access category. The priority increases from the top row to the bottom row. The traffic with higher priority has higher probability to be transmitted earlier.

Figure 18:
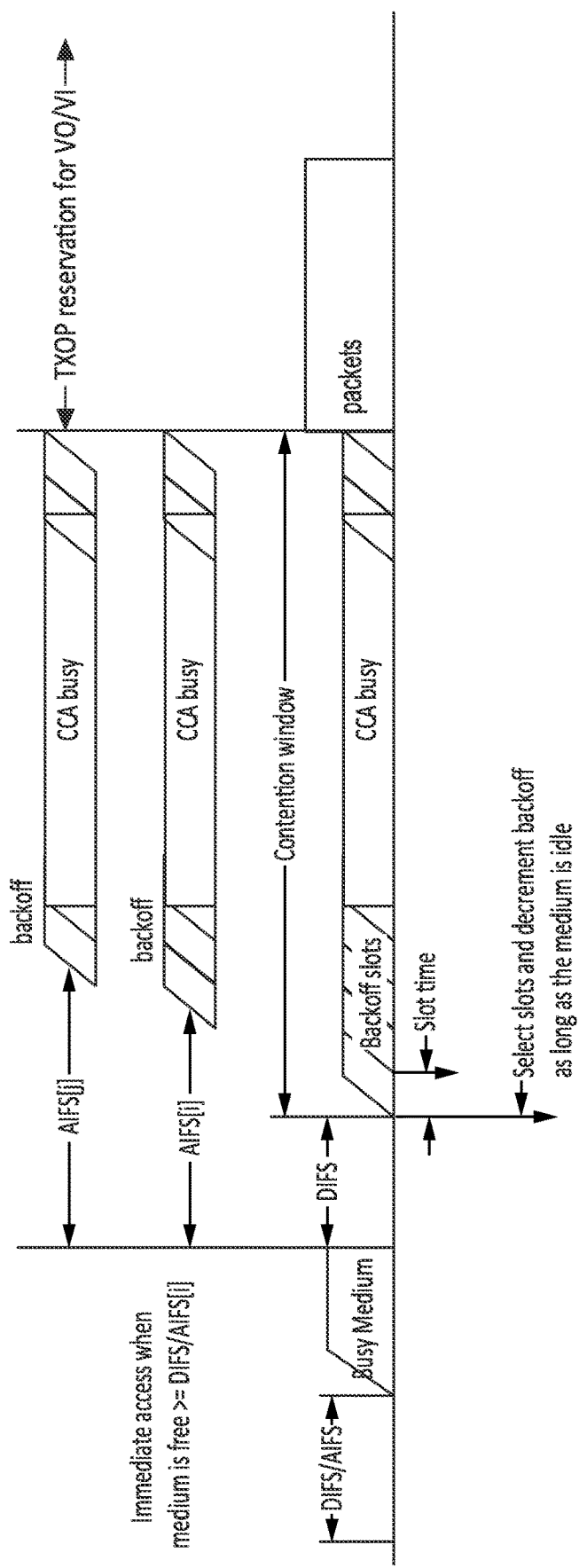
FIG. 18 is a communications format diagram of EDCA channel access.

FIG. 18 illustrates a channel access procedure for EDCA. As shown in the figure, it also compares the EDCA channel access when only the Distributed Coordination Function (DCF) is utilized. When only DCF is used, the STA is able to immediately access the channel when the medium is free for more than the DCF Interframe Space (DIFS) time. Otherwise, it uses CSMA/CA to contend for the channel. After sensing that the channel is idle for the DIFS time, it starts to count down the backoff as long as the medium is idle. The number of backoff slots is randomly chosen between 0 and its contention window. The contention window is updated as shown in FIG. 1. The STA pauses to count down the backoff when CCA busy occurs, such as when the STA senses that the channel is busy. When the backoff counts down to zero, the STA starts to transmit packets.

In EDCA, each EDCAF as shown in FIG. 17 is able to immediately access the channel and the medium is free for more than the Arbitration Interframe Spacing (AIFS) time of the AC which is to gain channel access. It should be appreciated that AIFS[i] as shown in the figure represents the AIFS time for AC i. Otherwise, each EDCAF uses CSMA/CA to contend for the channel for each AC that is to gain channel access. After sensing that the channel is idle for AIFS time, it starts to count down backoff as long as the medium is idle. The number of backoff slots is randomly chosen between 0 and its contention window size. The contention window size is updated as shown in FIG. 1. The STA pauses to count down the backoff when Clear Channel Assessment (CCA) busy occurs, such as when the STA senses that the channel is busy. When the backoff counts down to zero, the STA starts to transmit packets for that AC.

It should be appreciated that multiple EDCAFs can contend for the channel in parallel. For example, EDCAFs for AC i and AC j could contend for the channel at the same time as shown in FIG. 18. When an internal collision occurs, the EDCAF with higher priority will obtain channel access and the EDCAF with lower priority will double its contention window. When AC is VO or VI, they are able to reserve a period of contention free time, i.e., TXOP, for transmitting packets. The maximum duration of TXOP is denoted as the TXOP limit.

Table 2 lists the default parameter setting for EDCA channel access. Each AC has its own minimum contention window (CWmin) and maximum contention window (CWmax). AIFSN represents the AIFS duration in terms of the number of backoff slots. The TXOP limit represents the maximum duration of the TXOP that each AC can reserve each time.

1.4. Regular IEEE 802.11be PLCP Preamble

Figure 19:
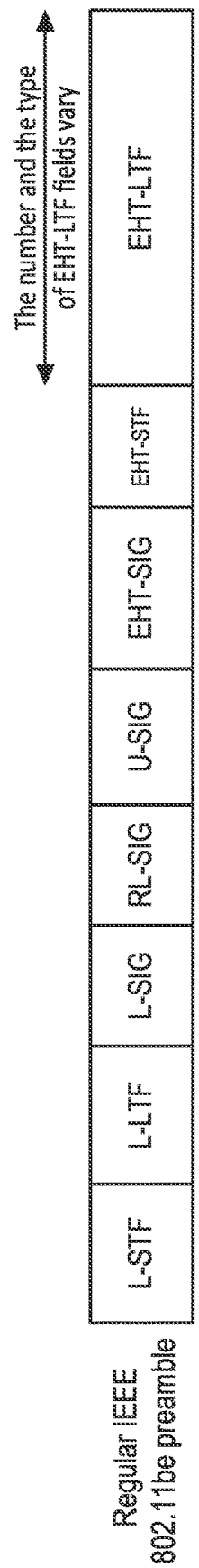
FIG. 19 is a data field diagram of a regular IEEE 802.11be preamble.

FIG. 19 is the regular IEEE 802.11be preamble format having the following fields. An L-STF field indicates the non-HT short training field. An L-LTF field indicates the non-HT long training field. An L-SIG field indicates the non-HT SIGNAL field. An RL-SIG field indicates the repeated non-HT SIGNAL field. A U-SIG field indicates the EHT universal field. An EHT-SIG field indicates the EHT SIGNAL field. An EHT-STF field indicates the EHT short training field; although it could be replaced by some other type of signal training field. An EHT-STF field indicates EHT short training field. An EHT-LTF field indicates an EHT long training field.

2. Problem Statement

The disclosed technology consider channel contention for a non-STR MLD using CSMA/CA. Due to the constraints of a non-STR non-AP MLD, there are challenges for a STR AP MLD contending for the channel to obtain access on multiple links and reserve TXOPs with non-STR non-AP MLDs.

Due to the in-device coexistence interference, it is a challenge for non-STR MLDs to contend for the channel in some scenarios. For a non-STR MLD, the in-device coexistence interference is high. It will be noted that in-device coexistence interference is the interference due to the signal transmission on a link by a STA of the MLD which can prevent proper signal reception on another link by another STA of the MLD. The non-STR MLD should not transmit on a link while receiving on another link simultaneously. For a STR MLD, it is able to transmit on a link while receiving on another link simultaneously due to its low in-device coexistence interference. For example, when a non-STR MLD detects a packet transmission on one link, denoted by Link1, it takes a period of detection time for a non-STR MLD to recognize whether it is the intended receiver of the packet transmission on Link1. It is a problem as to whether the MLD should be allowed to contend for the channel on another link, denoted by Link2, during the detection time of the packet transmission on Link1.

(A) If the non-STR MLD is allowed to contend for the channel on Link2 during the detection time on Link1, it may access the channel and transmits on Link2 during the detection time on Link1, which can destroy its ability for receiving on Link1. However, if the non-STR MLD is not the intended receiver of the packet transmission on Link1, it is harmless to interfere with its receiving on Link1.

(B) If the non-STR MLD is not allowed to contend for the channel on Link2 during the detection time on Link1, then it cannot contend for the channel during the detection time of any packet transmissions on Link1. In other words, any packet transmission on Link1 could block the channel contention of all the non-STR MLDs which operate on Link1 and Link2 during the detection time on Link1; thus making it unfair for non-STR MLDs to contend for the channel.

3. Contribution of the Disclosure

The disclosed technology describes multiple solutions for a non-STR MLD contending and accessing the channel on one link, denoted by Link2, during the detection time of the packet transmission on another link, denoted by Link1. The disclosed embodiments describe a backoff count-down procedure, channel accessing, and a backoff initialization and re-initialization that the non-STR MLD should operate on Link2 during its detection time on Link1.

4. Embodiment

4.1. STA Hardware Configuration

Figure 20:
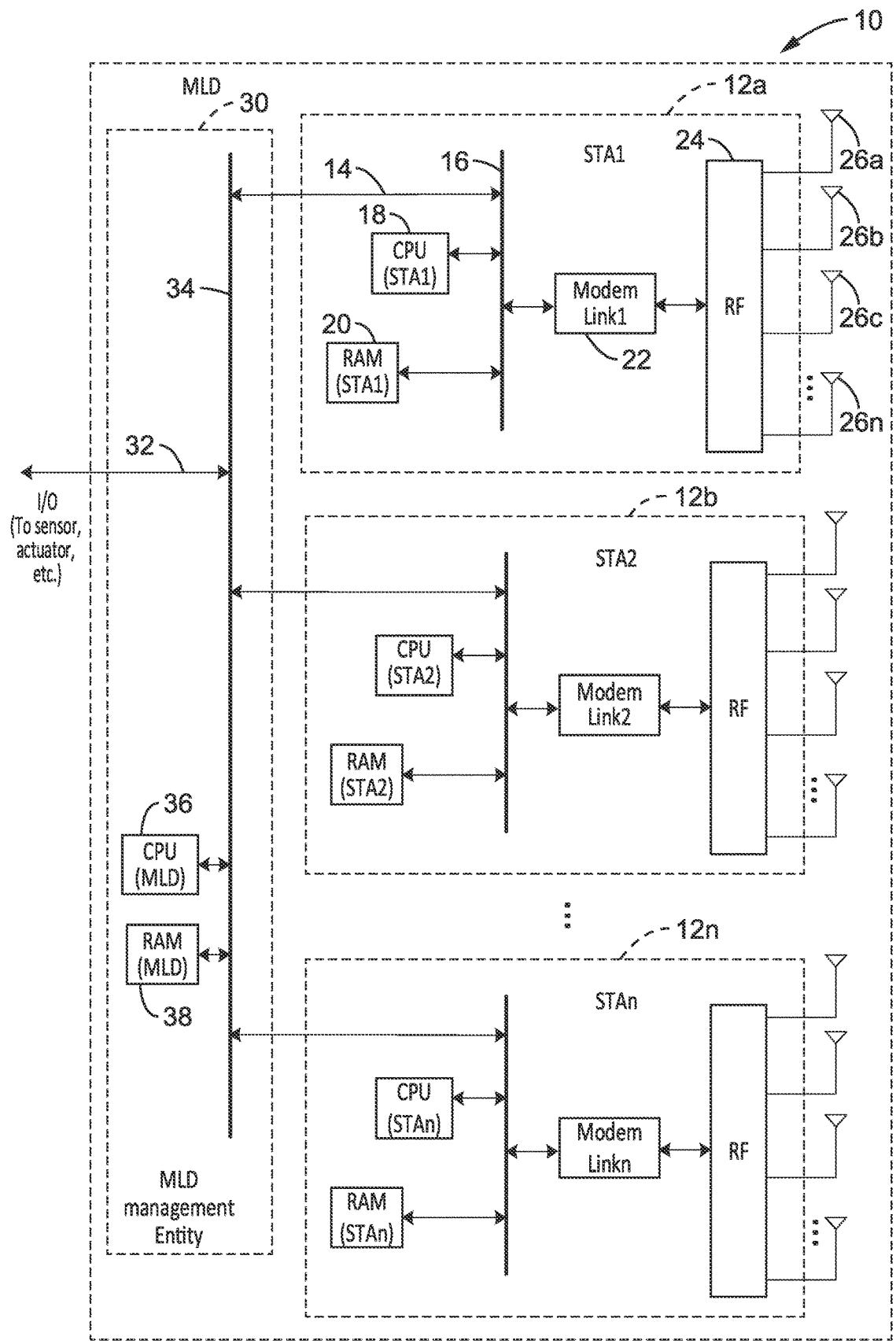
FIG. 20 is a hardware block diagram of a station configuration, such as contained in Multi-Link Device hardware, according to at least one embodiment of the present disclosure.

FIG. 20 illustrates an example embodiment 10 of station hardware, exemplified herein in a multi-link device (MLD) hardware configuration. Multiple STAs are affiliated with a MLD; having up to "n" stations 12a, 12b through 12n each of which operates on a link of a different frequency.

Hardware for each station (STA) has external I/O access 14 to applications, and an internal bus 16 connecting to at least one processor (CPU, MCU, SoC, or other control circuit) 18 and memory (e.g., RAM, or similar program and/or data store) 20, the combination being configured for execute programming that implements this wireless communication protocol.

Each STA accommodates at least one modem 22 to support communications coupled to at least one RF module 24 connected to one or more antennas 26a, 26b, 26c through 26n for performing communications, in one or more bands, such as sub-6 GHz band (e.g., 2.4, 5, 6 Ghz), and/or over millimeter wavelengths (mmW). In at least one embodiment the RF module 24 includes a frequency converter, array antenna controller, and other associated circuits.

In certain instances the RF can be configured for omnidirectional antenna operation, and/or may be directional to increase gain. By way of example, RF module 24 is shown having multiple antennas to support beamforming for transmission and reception on that band. In this way, the STA may transmit signals using one or multiple sets of beam patterns. It should be appreciated that any desired bands can be supported by the teachings of the present disclosure. The present example shows multiple STAs grouped (clustered) in this multi-link device.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (e.g., source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinatee and so forth), depending on what role it is playing in the current communications context. In addition the protocol is configured for operating with separate stations or stations within multi-link devices (MLDs) which are configured for either Simultaneous Transmit and Receive (STR MLD), or do not have that capability (non-STR MLD).

It should be appreciated that the STAs of the present disclosure, such as those within this MLD, can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

The MLD is shown having an internal bus 34 for communicating between its processor 36 and associated memory 38, and each of the STAs 12a, 12b through 12n. In addition, the MLD has external I/O 32 to access applications for MLD, CPU and RAM of MLD management entity, to run a program that implements communication protocols at the MLD level. It can distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus, the present disclosure contemplates many possible arrangements for communication over multiple links within an MLD.

4.2. STA Topology for Consideration

Figure 21:
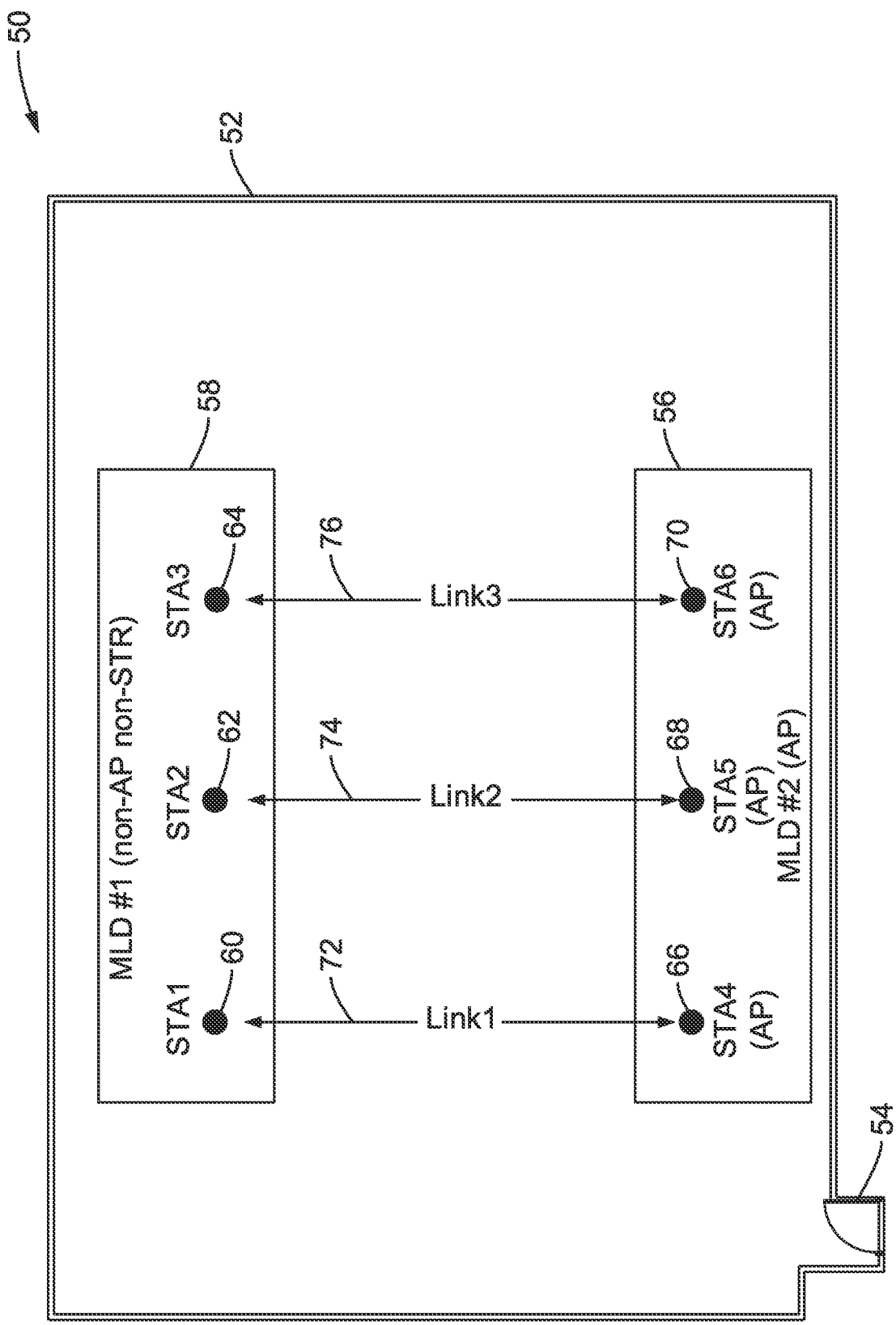
FIG. 21 is a station topology embodiment for consideration according to at least one embodiment of the present disclosure.

FIG. 21 illustrates an example embodiment 50 of a wireless topology between MLDs. To better explain the goal of the disclosed technology, the figure sets up a network scenario. It should be appreciated that this topology is only shown for illustrating the example cases described herein; as the present disclosure provides a protocol which can be operated in any desired topology.

A multi-link device (MLD) is a device that has more than one affiliated STA and has one Media Access Control (MAC) Service Access Point (SAP) to a Logical Link Control (LLC), which includes one MAC data service. The example assumes that there are six STAs 60, 62, 64, 66, 68 and 70 across two MLDs 56 and 58 installed in some local area or structure (e.g., meeting room) 52, exemplified with one or more apertures (windows/doors) 54. STA1 60, STA 2 62 and STA3 64 are affiliated with a non-AP MLD1, while STA4 66, STA5 68 and STA6 70 are affiliated with an AP MLD2. STAs 4, 5 and 6 are associated with STAs 1, 2 and 3 over links 1, 2 and 3 (72, 74 and 76), respectively.

By way of example and not limitation, MLD #2 is able to transmit on one link and receive on the other link simultaneously, and thus is referred to as a Simultaneous Transmit and Receive (STR) MLD. By way of example and not limitation, MLD #1 is exemplified as an MLD that is not able to transmit on one link and receive on the other link simultaneously, due to in-device operation constraints, and referred to as a non-STR MLD. A non-STR MLD can either transmit on one or both links simultaneously or receive on one or both links simultaneously. In the network topology example, MLD #1 is an non-STR MLD, while the other MLD in this example can be either STR or non-STR.

All STAs use CSMA/CA for random channel access. Although it is possible that the MLD only enables one STA and behaves as a single link device.

4.3. Flowcharts of Embodiments

4.3.1. Channel Contention During Packet Recognition Time

This section explains a flow diagram for channel contention of a non-STR MLD on link, denoted by Link2, during the time it detects a packet transmission on another link, denoted by Link1, but does not have information to recognize whether it is the intended receiver of the packet on Link1. The time from the non-STR MLD starting to detect a packet transmission until it first obtains information of the intended receiver of the packet on a link is denoted as 'recognition time'.

Specifically, the recognition time may comprise the time from the non-STR MLD starting to detect a packet transmission until it recognizes that it failed to decode the packet transmission on Link1. Then, it is possible that the non-STR MLD determines that it is not the intended receiver of the packet on Link1.

The non-STR MLD transmitting on Link2 interferes and may destroy its own reception on Link1. Or simply, Link1 and Link2 are one non-STR link pair (i.e., the transmitting on one link interferes and may destroy the receiving on the other link) of the non-STR MLD. After the recognition time on Link1, the non-STR MLD recognizes one of the following: (a) it is the intended receiver of the packet on Link1, or (b) it is not the intended receiver of the packet on Link1, or (c) that it may be the intended receiver of the packet on Link1. That is, the non-STR MLD has some information, such as partial AID (Association ID), BSS color information (numerical identifier of the BSS), or similar, to show it may be the intended receiver but requires additional information to confirm if it is true.

This section proposes two solutions. (1) Channel contention on Link2 is not allowed during the recognition time on Link1. (2) Channel contention on Link2 is allowed during the recognition time on Link1. It should be noted that the non-STR MLD can have more than two affiliated STAs which operate on multiple links. Channel contention after the recognition time is explained in Section 4.3.2.

4.3.1.1. Solution 1: Channel Contention not Allowed

Figure 22:
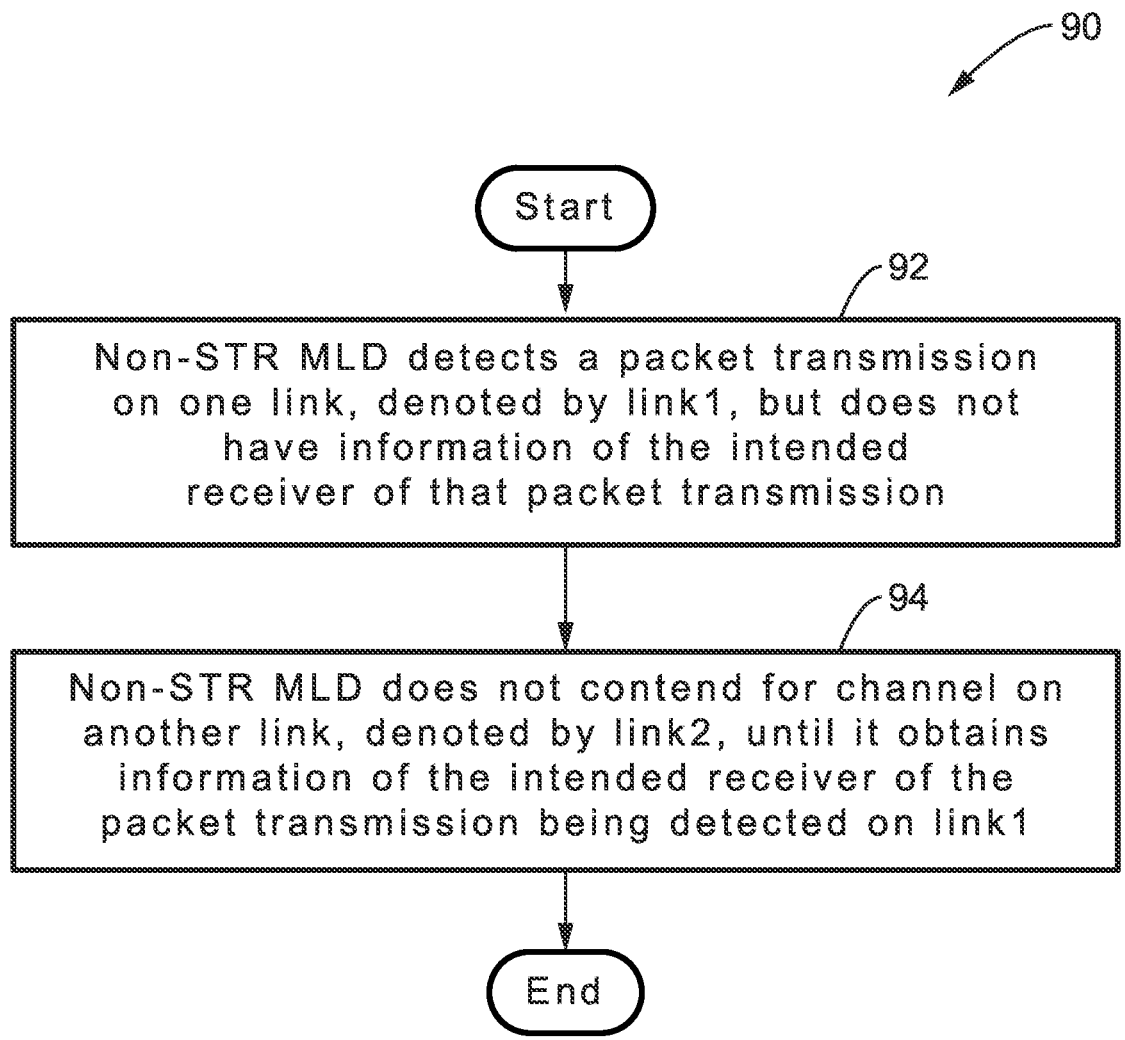
FIG. 22 is a flow diagram of a non-STR MLD not allowed to contend for the channel during packet recognition time according to at least one embodiment of the present disclosure.

FIG. 22 illustrates an example embodiment 90 for non-STR MLD not allowed to contend for the channel during the packet recognition time period.

When a non-STR MLD detects a packet transmission 92 on one link, denoted by Link1, but does not have any information of the intended receiver of that link, it does not contend for the channel on another link, denoted by Link2, until it obtains 94 information of the intended receiver of the packet transmission being detected on Link1.

4.3.1.2. Solution 2: Channel Contention Allowed

Figure 23:
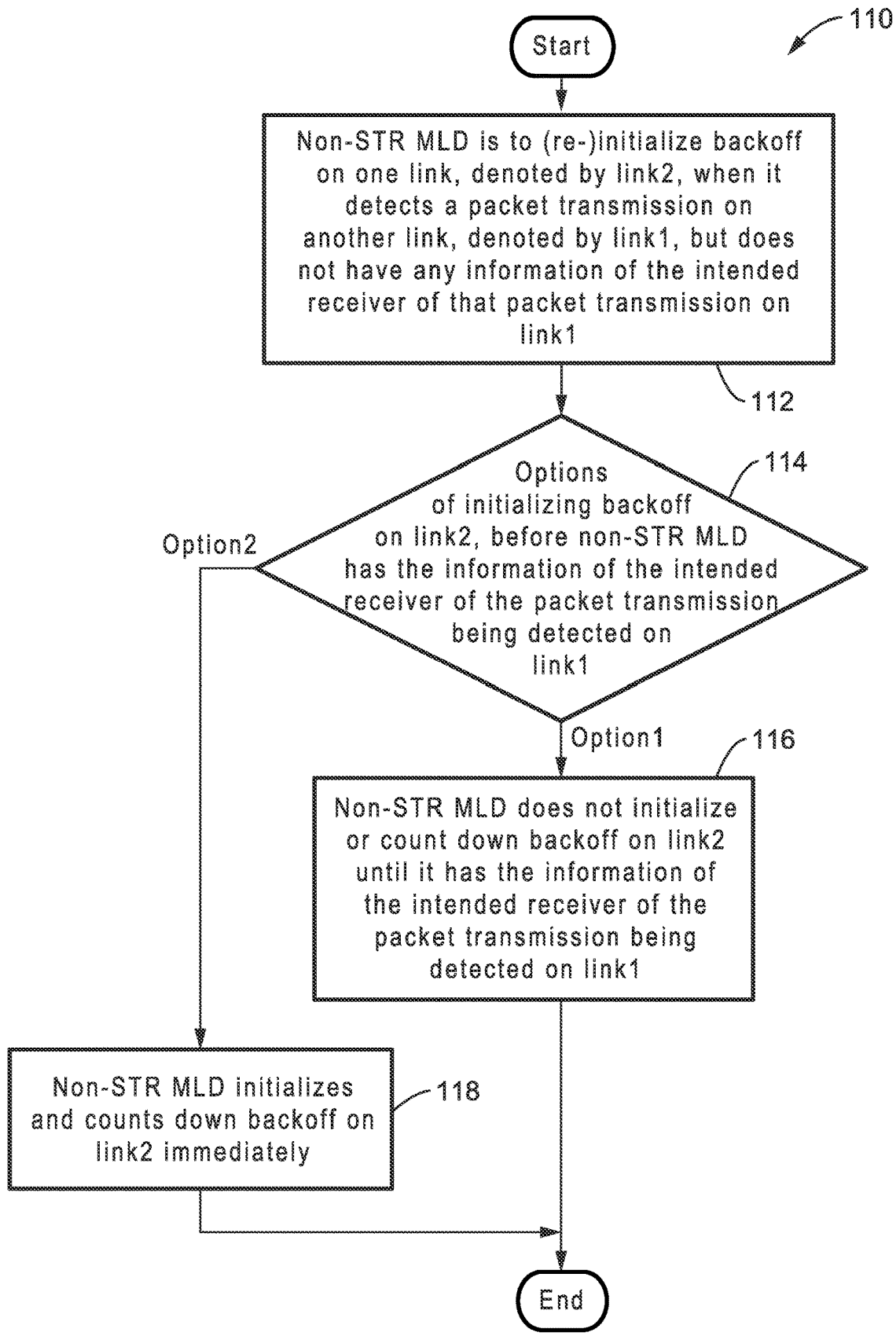
FIG. 23 is a flow diagram of operations of a non-STR MLD when channel contention is allowed on Link2 during the recognition time on Link1 according to at least one embodiment of the present disclosure.

FIG. 23 illustrates an example embodiment 110 of a non-STR MLD when channel contention is allowed on Link2 during the recognition time on Link1, showing the non-STR MLD initializing or re-initializing the backoff on Link2 during packet recognition time on Link1.

The Non-STR MLD is to (re-)initialize backoff 112 on one link, denoted by Link2, when it is detecting a packet transmission on another link, denoted by Link1, but does not have any information of the intended receiver of that packet transmission on Link1. Said another way, the non-STR MLD is to (re-)initialize backoff on Link2 during recognition time on Link1.

At block 114 a decision is made between two options of backoff (re-) initialization on Link2, before non-STR MLD has the information of the intended receiver of the packet transmission being detected on Link1.

If the first option 116 is selected, then the non-STR MLD does not initialize or count down backoff on Link2 until it has the information of the intended receiver of the packet transmission being detected on Link1. Thus the non-STR MLD does not initialize or count down backoff on Link2 during the recognition time on Link1.

If the second option 118 is selected, then the non-STR MLD initializes and counts down backoff on Link2 immediately.

Figure 24:
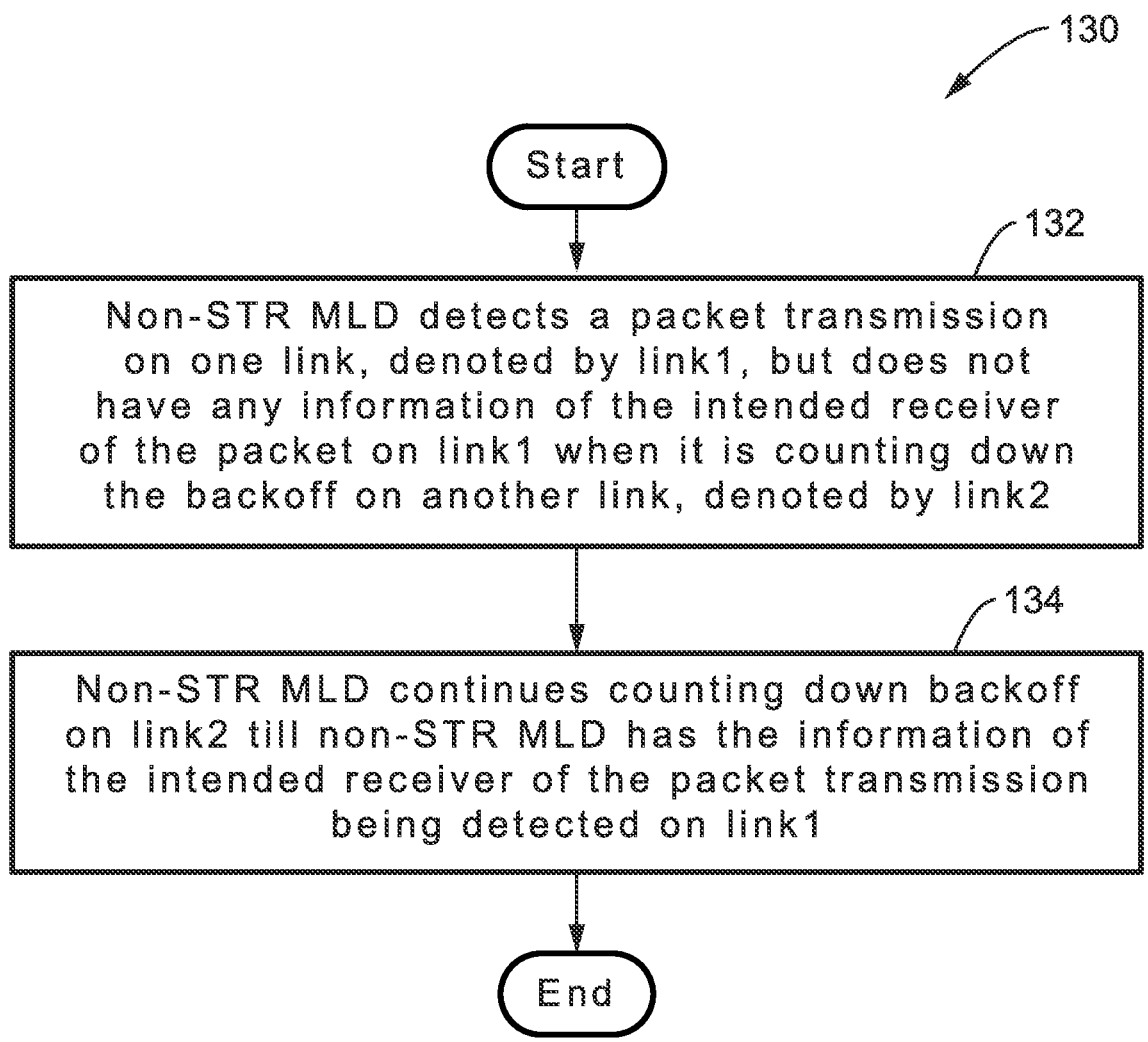
FIG. 24 is a flow diagram of a non-STR MLD continuing counting down the backoff on Link2 during the recognition time on Link1 according to at least one embodiment of the present disclosure.

FIG. 24 illustrates an example embodiment 130 for a non-STR MLD continuing counting down backoff on Link2 during the recognition time on Link1.

The non-STR MLD detects 132 a packet transmission on one link, denoted by Link1, but does not have any information of the intended receiver of the packet on Link1 when it is counting down the backoff on another link, denoted by Link2. In other words, the non-STR MLD is counting down backoff on Link2 at the beginning of the recognition time on Link1.

In such a scenario, the non-STR MLD continues counting down 134 the backoff on Link2 until the non-STR MLD has the information of the intended receiver of the packet transmission being detected on Link1.

Figure 25:
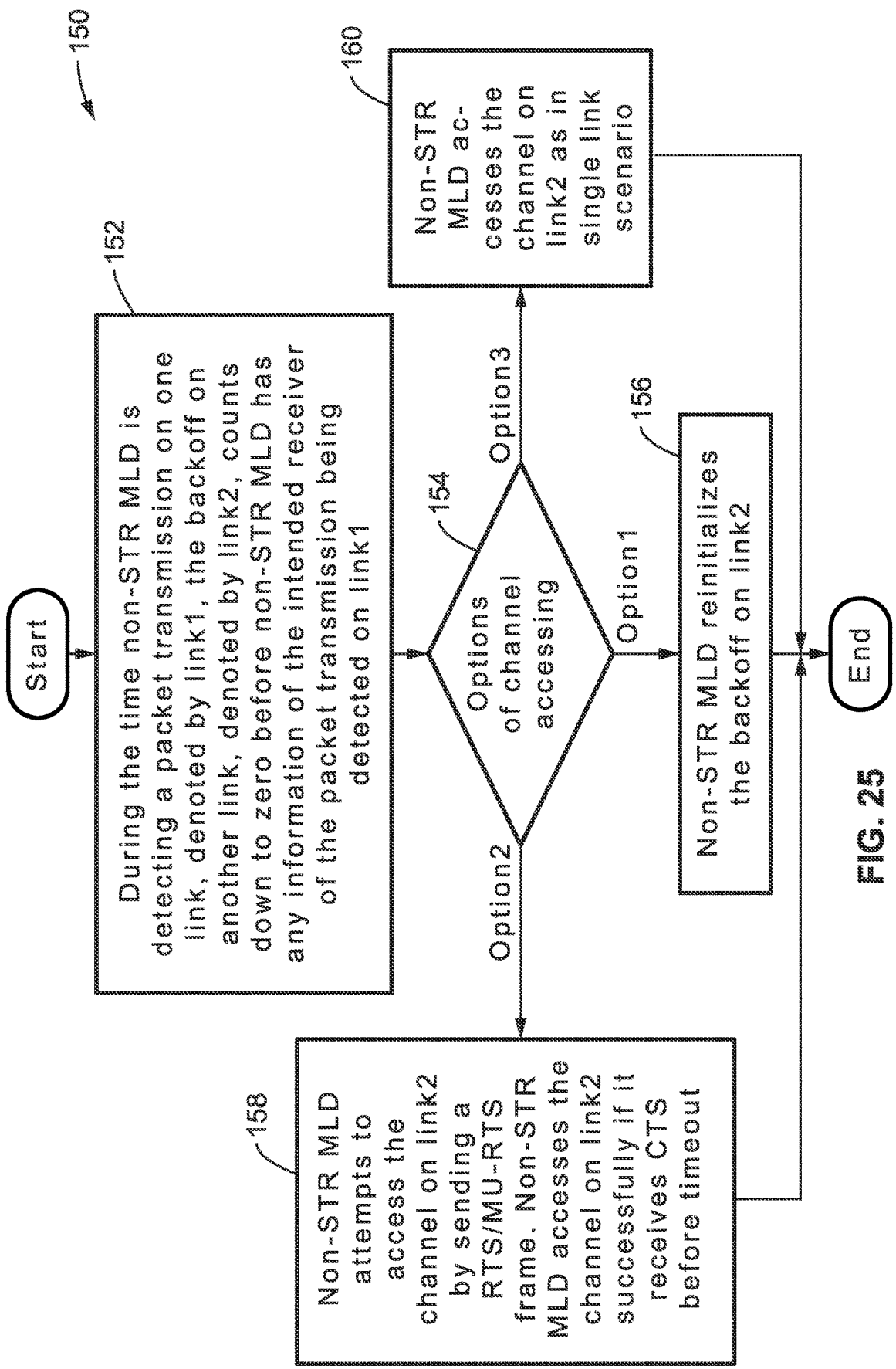
FIG. 25 is a flow diagram of a non-STR MLD accessing the channel on Link2 during packet recognition time on Link1 according to at least one embodiment of the present disclosure.

It should be noted that when the backoff on Link2 counts down to zero during the recognition time on Link1 then channel access by the non-STR MLD on Link2 is explained in FIG. 25. Then, initialization or re-initialization of another backoff on Link2 is explained in FIG. 23.

FIG. 25 illustrates an example embodiment 150 of a non-STR MLD accessing the channel on Link2 during packet recognition time on Link1.

Let us consider the following scenario. During the time that the non-STR MLD is detecting 152 a packet transmission on one link, denoted by Link1, the backoff of the non-STR MLD on another link, denoted by Link2, counts down to zero before the non-STR MLD has the information of the intended receiver of the packet transmission being detected on Link1. Thus the non-STR MLD counts down the backoff to zero on Link2 during the recognition time on Link1.

In such a scenario, the non-STR MLD can provide for multiple options 154, which in this particular embodiment is exemplified, by way of example and not limitation, with three options for channel accessing.

Option1: the non-STR MLD reinitializes 156 the backoff on Link2. The backoff re-initialization procedure on Link2 during the recognition time on Link1 was explained in FIG. 23. When the non-STR re-initializes the backoff on Link2, the corresponding backoff counter can be reset as one of the following options. (a) The non-STR regards the backoff re-initialization as an internal collision as defined in IEEE 802.11. The backoff counter can be reset following the rule of the occurrence of the internal collision. (b) The non-STR does not change the contention window size on Link2 and resets the backoff counter to a random number between 0 and the contention window size. (c) The non-STR resets the backoff counter on Link2 to its value at the beginning time of the recognition time on Link1.

Option2: the non-STR MLD attempts to access the channel on Link2 by sending an RTS/MU-RTS frame 158. The non-STR MLD accesses the channel on Link2 successfully if it receives a CTS before timeout. The STA transmitting the CTS frame can follow the flowchart as explained in FIG. 26. The transmission power and MCS of the RTS/MU-RTS can be limited to avoid or reduce the chance of the transmission of RTS/MU-RTS on Link1 obstructing reception on Link2.

Option3: the non-STR MLD accesses 160 the channel on Link2 as in a single link scenario. It is possible that the non-STR MLD limits the transmission power and MCS of the transmission on Link2 to avoid or reduce the chance of destroying reception on Link2.

Figure 26:
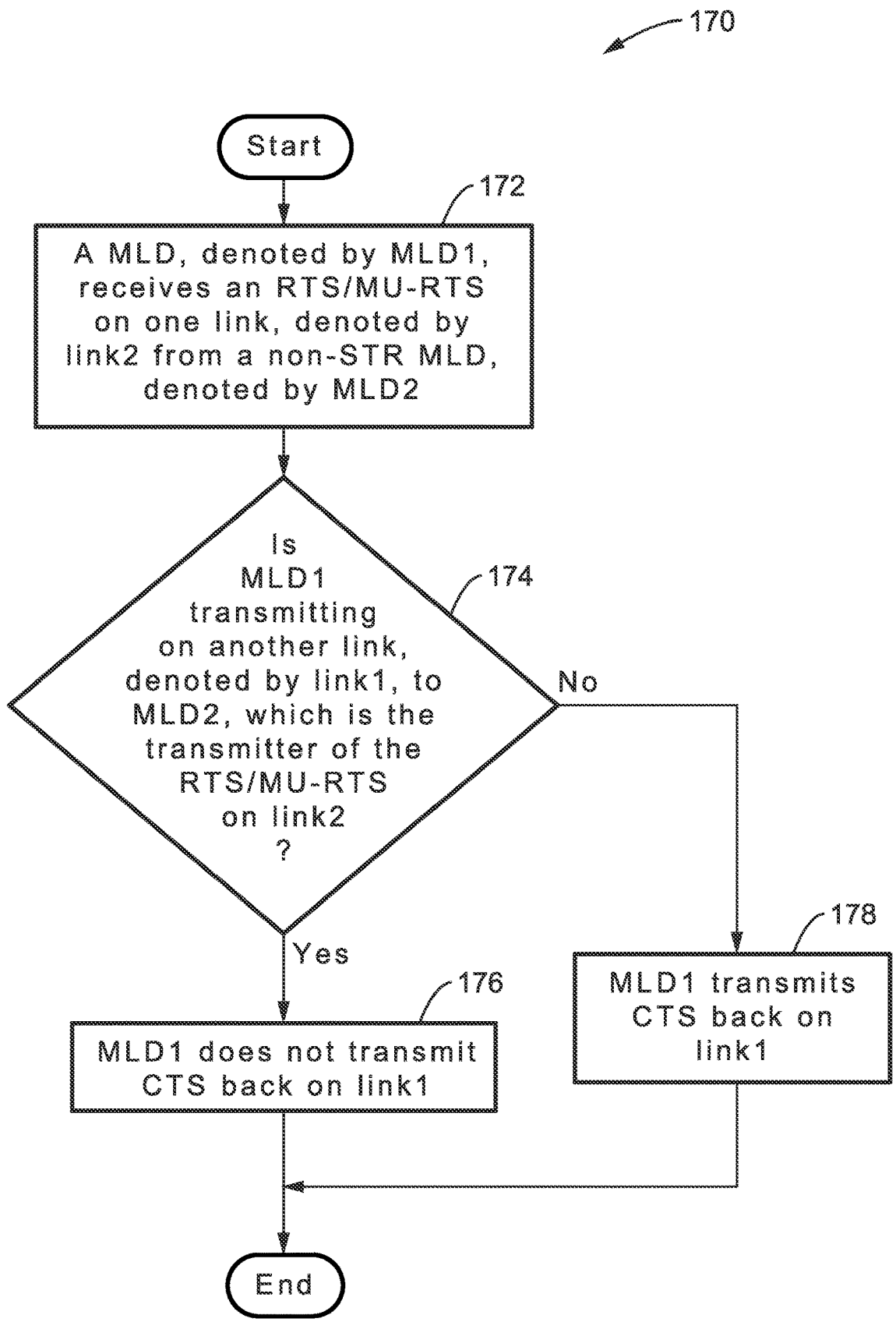
FIG. 26 is a flow diagram of an MLD making a decision on sending CTS when it receives RTS/MU-RTS on one link according to at least one embodiment of the present disclosure.

FIG. 26 illustrates an example embodiment 170 for an MLD making a decision on sending CTS when it receives RTS/MU-RTS on one link.

A MLD, denoted by MLD1, receives 172 a RTS/MU-RTS on one link, denoted by Link2, from a non-STR MLD, denoted by MLD2. If it is determined at block 174 that the MLD1 is transmitting on another link, denoted by Link1, to MLD2 with MLD2 being the transmitter of the RTS/MU-RTS on Link2, then at block 176 MLD1 does not transmit CTS back on Link1. Otherwise, block 178 is reached and MLD1 transmits CTS back on Link1.

4.3.2. Channel Contention after Packet Tx Recognition Period

This section illustrates channel contention of a non-STR MLD on one link, denoted by Link2, after the recognition time on another link, denoted by Link1. The non-STR MLD transmitting on Link2 interferes and (may) destroy its ability to receive on Link1. Or simply, Link1 and Link2 are one non-STR link pair (i.e., the transmitting on one link interferes and may destroy the receiving on the other link) of the non-STR MLD. It should be appreciated that the non-STR MLD can have more than two affiliated STAs which operate on multiple links.

Figure 27:
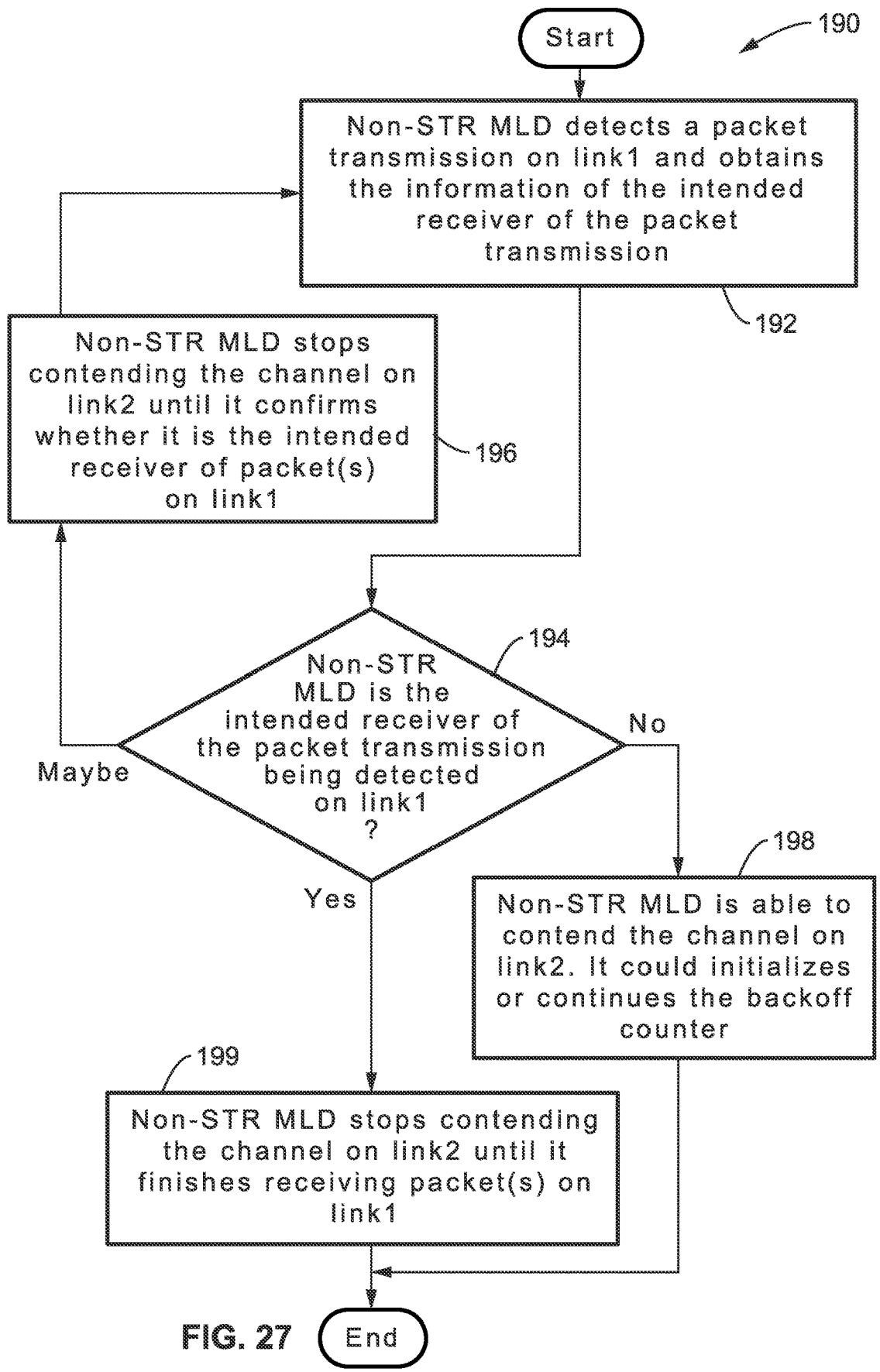
FIG. 27 is a flow diagram of a non-STR MLD channel accessing Link2 after packet transmission recognition time on Link1 according to at least one embodiment of the present disclosure.

FIG. 27 illustrates an example embodiment 190 for non-STR MLD channel accessing on Link2 after packet transmission recognition time on Link1.

Let us consider the following scenario. A non-STR MLD detects a packet transmission on Link1 and obtains information 192 about the intended receiver of the packet transmission.

A check 194 determines if the non-STR MLD is the intended receiver of the packet transmission being detected on Link1.

If the condition is met, then at block 199 the STA stops contending for the channel on Link2 until it finishes receiving packet(s) on Link1.

However, if it is determined at block 194 that the non-STR MLD is not the intended receiver of the packet transmission being detected on Link1, then execution moves to block 198 and it is able to contend for the channel on Link2, wherein it can initialize the backoff counter or continue counting down the backoff counter.

It is also possible that at block 194 that it will be determined that the information obtained only shows that the non-STR MLD may be the intended receiver of the packet transmission being detected on Link1, and execution reaches block 196 in which it stops contending for the channel on Link2 until it has more information to confirm whether it is the intended receiver of the packet on Link1.

4.3.3. Non-STR Monitors During Packet Tx Detected on One Link

Figure 28:
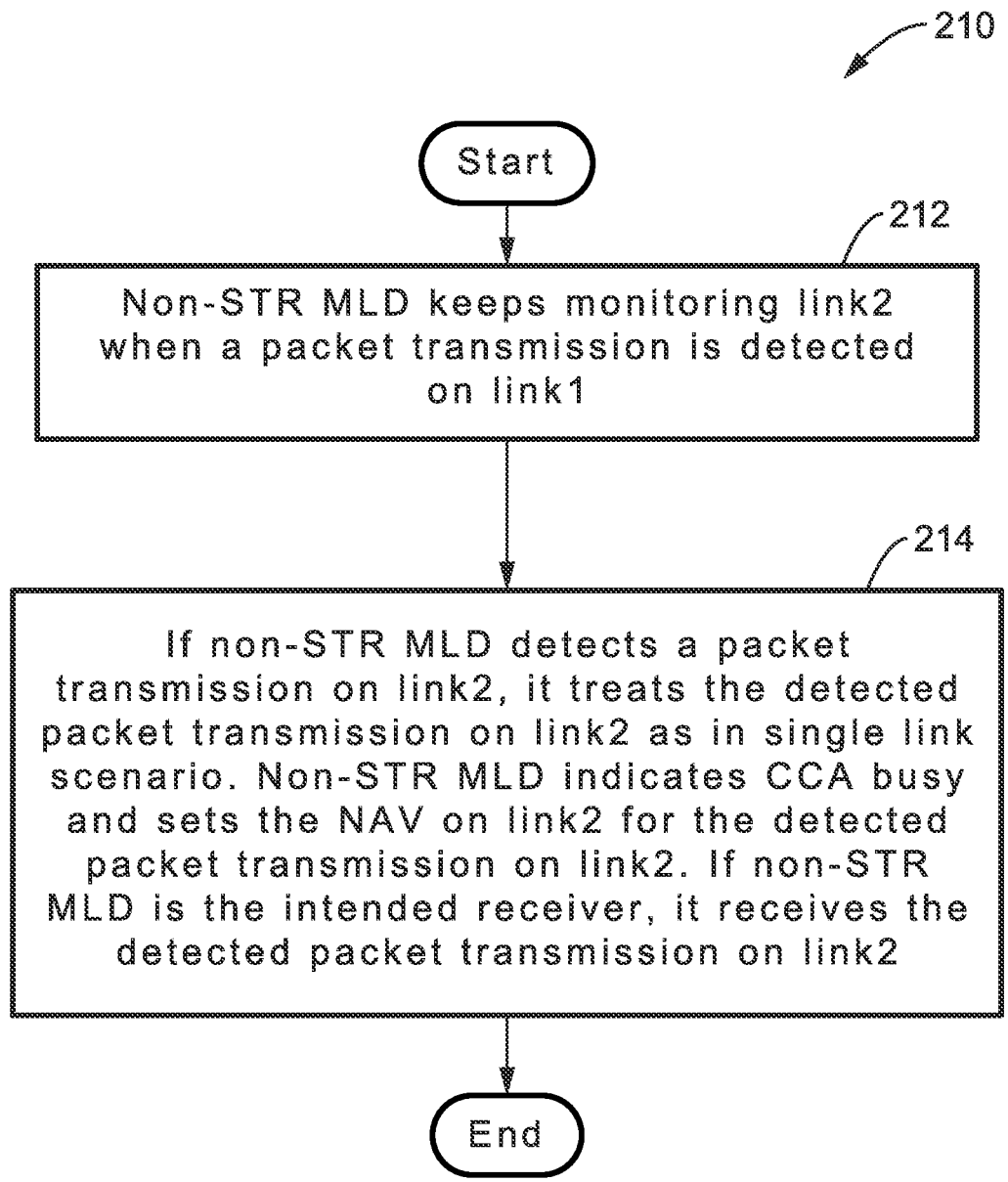
FIG. 28 is a flow diagram of a non-STR monitoring one link, denoted by Link2, when a packet transmission is detected on another link, denoted by Link1 according to at least one embodiment of the present disclosure.

FIG. 28 illustrates an example embodiment 210 of a non-STR monitoring one link, denoted by Link2, when a packet transmission is detected on another link, denoted by Link1. The non-STR MLD transmitting on Link2 interferes and (may) destroy its ability to receive on Link1. Or simply, Link1 and Link2 are one non-STR link pair (i.e., the transmitting on one link interferes and may destroy the receiving ability on the other link) of the non-STR MLD. It should be appreciated that the non-STR MLD can have more than two affiliated STAs which operate on multiple links.

The non-STR MLD keeps monitoring Link2 when a packet transmission is detected 212 on Link1.

If the non-STR MLD detects a packet transmission on Link2 214, it treats the detected packet transmission on Link2 as in a single link scenario. The non-STR MLD indicates CCA busy and sets the NAV on Link2 for the detected packet transmission on Link2. If the non-STR MLD is the intended receiver, it receives the detected packet transmission on Link2.

4.4. Example of Operations According to Embodiments

This section illustrates channel contention of a non-STR MLD on one link, denoted by Link2, after the recognition time on another link, denoted by Link1. The non-STR MLD transmitting on Link2 interferes and (may) destroy its receiving on Link1. Or simply, Link1 and Link2 are one non-STR link pair (i.e., the transmitting on one link interferes and may destroy the ability to receive on the other link) of the non-STR MLD. The network topology of this example was previously shown in FIG. 21. STA1 and STA2 are affiliated with non-STR MLD #2.

By way of example and not limitation, Link1 and Link2 were chosen for the examples, however in practice the link may be any combinations of the links operated by a non-STR MLD, such as Link2 and link3 as shown in FIG. 21.

It should also be noted that the non-STR MLD shown in the examples can be an AP MLD or a non-AP MLD, and it can be associated with another non-STR or STR MLD in the network.

4.4.1. Ex. Solution 1—Contend During Packet Detection Time

FIG. 29 illustrates an example embodiment 230 of a non-STR MLD deferring backoff initialization on Link2 during the recognition time on Link1.

The non-STR MLD 58 is shown with STA1 60 and STA2 62, communicating overs Link1 72 and Link2 74.

STA1 detects 234 a packet transmission on Link1 during the packet transmission recognition time 232 for Link1. STA2 has packets to transmit 236 and plans to initialize backoff on Link2. As explained for blocks 92 and 94 of FIG. 22, it is possible that STA2 is not allowed to contend for the channel on Link2 during the recognition time on Link1. It thus defers backoff initialization 238 until the end of the recognition time 232 of the packet transmission on Link1. In this example, at the end of the recognition time on Link1, STA1 recognizes it is not the intended receiver of the packet transmission on Link1. STA2 thus initializes and counts down the backoff 240 on Link2, which is explained in block 199 of FIG. 27. When STA2 finishes the backoff on Link2, it can transmit the packets 242.

FIG. 30 illustrates an example embodiment 250 of a first example of a non-STR MLD pausing backoff on Link2 during the recognition time on Link1.

As in the previous example, the non-STR MLD 58 is shown with STA1 60 and STA2 62, communicating overs Link1 72 and Link2 74.

STA1 detects 234 a packet transmission on Link1 during packet transmission recognition time 232 while STA2 is counting down backoff 252 on Link2. As explained for block 92 and 94 for FIG. 23, it is possible that STA2 is not allowed to contend for the channel on Link2 during the recognition time on Link1. In that case it pauses 254 counting down the backoff on Link2 until the STA recognizes whether it is the intended receiver of the packet transmission on Link1. In this example, at the end of the recognition time 232 on Link1, STA1 recognizes it is not the intended receiver 233 of the packet transmission on Link1. STA2 continues counting down the backoff 252 on Link2, which is explained for block 199 in FIG. 27. When STA2 finishes the backoff on Link2, it can transmit packets 242.

FIG. 31 illustrates an example embodiment 270 of a second example of a non-STR MLD pausing backoff on Link2 during the recognition time on Link1.

As in the previous examples, the non-STR MLD 58 is shown with STA1 60 and STA2 62, communicating overs Link1 72 and Link2 74.

STA1 detects a packet transmission 234 on Link1 while STA2 is counting down backoff 252 on Link2. As explained for block 92 and 94 for FIG. 22, it is possible that STA2 is not allowed to contend for the channel on Link2 during the recognition time on Link1. It thus pauses 271 counting down backoff on Link2, but keeps monitoring the channel for CCA busy 272 until the STA recognizes whether it is the intended receiver of the packet transmission on Link1. In this example, at the end time of the recognition time 232 on Link1, STA1 recognizes it is not the intended receiver 233 of the packet transmission on Link1. STA2 thus continues counting down the backoff 240 on Link2, which is explained for block 199 of FIG. 27. When STA2 finishes the backoff on Link2, it can transmit packets 242.

FIG. 32 illustrates an example embodiment 290 of a third example of a non-STR MLD pausing backoff on Link2 during the recognition time on Link1.

As in the previous examples, the non-STR MLD 58 is shown with STA1 60 and STA2 62, communicating overs Link1 72 and Link2 74.

STA1 detects a packet transmission 234 on Link1 while STA2 is counting down backoff 252 on Link2. As explained for blocks 92 and 94 in FIG. 22, it is possible that STA2 is not allowed to contend for the channel on Link2 during the packet transmission recognition time on Link1. It pauses 291 counting down backoff on Link2 until the end of the recognition time of the packet transmission on Link1. During the recognition time 232 on Link1, STA2 can keep monitoring the channel and receiving packets on Link2 as explained for blocks 212 and 214 in FIG. 28. In this example, at the end of recognition time 232, STA1 recognizes 233 that it is not the intended receiver of the packet transmission on Link1. After STA2 finishes receiving the packet 292 on Link2 (including the solicited transmission such as ACK, BA, etc.), it continues counting down the backoff 294 on Link2, which is explained for block 199 for FIG. 27. When STA2 finishes the backoff on Link2, it can proceed to transmit packets 296.

Figures 33, 34:
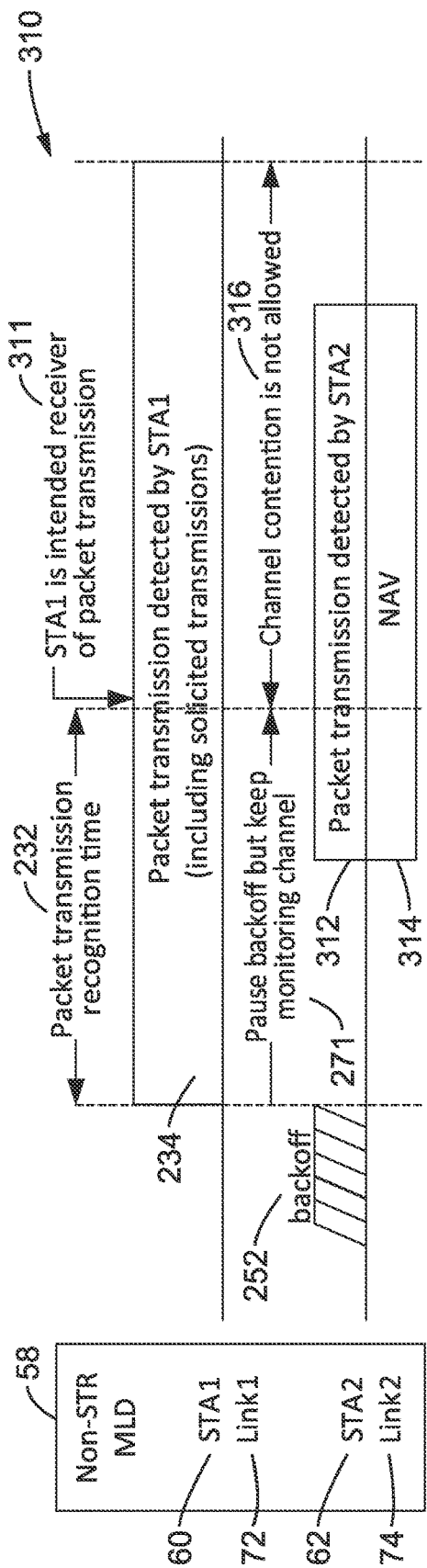
FIG. 33 is a communications sequence diagram with a fourth example of a non-STR MLD pausing backoff on Link2 during the recognition time on Link1 according to at least one embodiment of the present disclosure.
FIG. 34 is a communications sequence diagram with a fifth example of a non-STR MLD pausing backoff on Link2 during the packet transmission recognition time on Link1 according to at least one embodiment of the present disclosure.

FIG. 33 illustrates an example embodiment 310 as a fourth example of non-STR MLD pausing backoff on Link2 during the packet transmission recognition time on Link1.

As in the previous examples, the non-STR MLD 58 is shown with STA1 60 and STA2 62, communicating overs Link1 72 and Link2 74.

STA1 detects a packet transmission 234 on Link1 while STA2 is counting down backoff 252 on Link2. As explained for block 92 and 94 for FIG. 22, it is possible that STA2 is not allowed to contend for the channel on Link2 during the recognition time on Link1. It pauses 271 counting down backoff on Link2 until the end of the recognition time 232 of the packet transmission on Link1. During the recognition time on Link1, STA2 can keep monitoring the channel and is seen detecting packet transmission 312 by STA2 setting NAV 314 on Link2 as explained for blocks 212 and 214 in FIG. 28. In this example, at the end of the recognition time on Link1, STA1 recognizes it is the intended receiver 311 of the packet transmission on Link1. The backoff on Link2 is not allowed 316 until STA1 finishes receiving packet on Link1 (including the solicited transmission such as ACK, BA, etc.), which is explained for block 198 of FIG. 27.

FIG. 34 illustrates an example embodiment 330 as a fifth example of non-STR MLD pausing backoff on Link2 during the packet transmission recognition time on Link1.

As in the previous examples, the non-STR MLD 58 is shown with STA1 60 and STA2 62, communicating overs Link1 72 and Link2 74.

STA1 detects a packet transmission 234 on Link1 while STA2 is counting down backoff 252 on Link2. As explained for blocks 92 and 94 for FIG. 22, it is possible that STA2 is not allowed to contend for the channel on Link2 during the recognition time on Link1. It should pause 271 counting down backoff on Link2 until the end of the recognition time 232 on Link1. In this example, at the end of recognition time 232 on Link1, STA1 only recognizes that it may be the intended receiver 331 of the packet transmission on Link1. Then, channel contention is not allowed 316 on Link2 as explained for block 196 in FIG. 27. As shown in this example, STA1 then confirms 233 that it is not the intended receiver of the packet transmission on Link1, then STA1 continues counting down 332 the backoff on Link2 with CCA busy 334, which is explained for block 199 in FIG. 27. When STA2 finishes the backoff on Link2, it can transmit packets 336.

Figure 35:
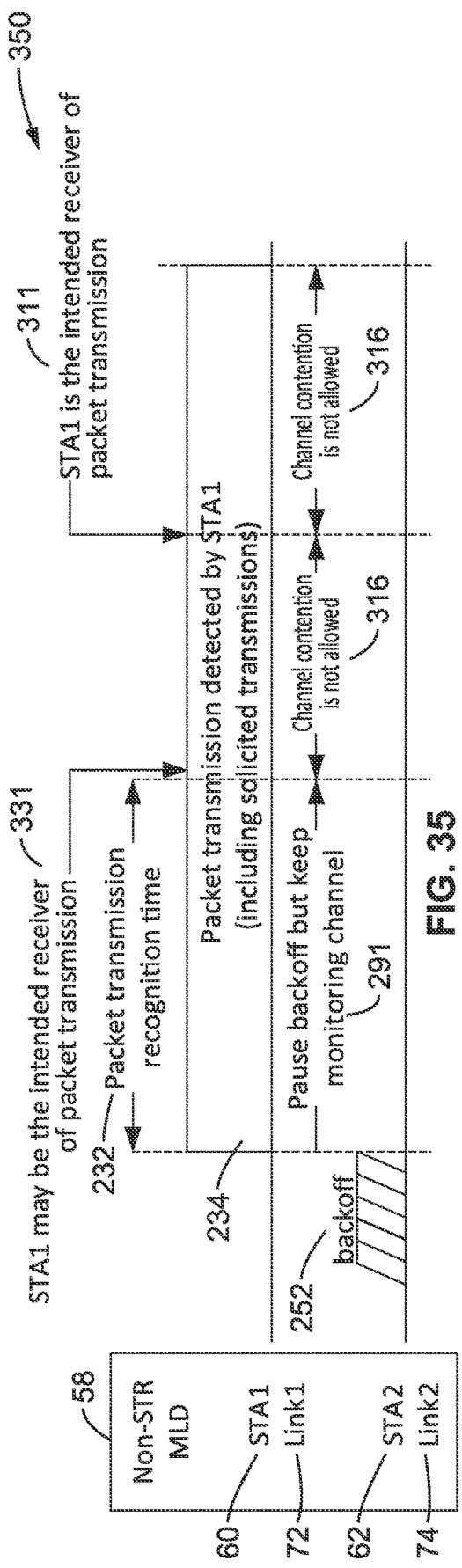
FIG. 35 is a communications sequence diagram with a sixth example of a non-STR MLD pausing backoff on Link2 during the packet transmission recognition time on Link1 according to at least one embodiment of the present disclosure.

FIG. 35 illustrates an example embodiment 350 as a sixth example of a non-STR MLD pausing backoff on Link2 during the packet transmission recognition time on Link1.

As in the previous examples, the non-STR MLD 58 is shown with STA1 60 and STA2 62, communicating overs Link1 72 and Link2 74.

STA1 detects a packet transmission 234 on Link1 while STA2 is counting down backoff 252 on Link2. As explained for blocks 92 and 94 in FIG. 22, it is possible that STA2 is not allowed to contend for the channel on Link2 during the recognition time 232 on Link1. It should pause 291 counting down backoff on Link2 until the end of the recognition time on Link1. In this example, at the end of the recognition time on Link1, STA1 recognizes it may be the intended receiver 331 of the packet transmission on Link1. Then, channel contention is not allowed 316 on Link2 as explained for block 196 in FIG. 27. As shown in this example, STA1 then confirms that it is the intended receiver 311 of the packet transmission on Link1. The backoff on Link2 is not allowed 316 until STA1 finishes receiving packets on Link1 (including the solicited transmission such as ACK, BA, etc.), which is explained for block 198 of FIG. 27.

4.4.2. Ex. 2 Channel Contention During Packet Detection Period

Figure 36:
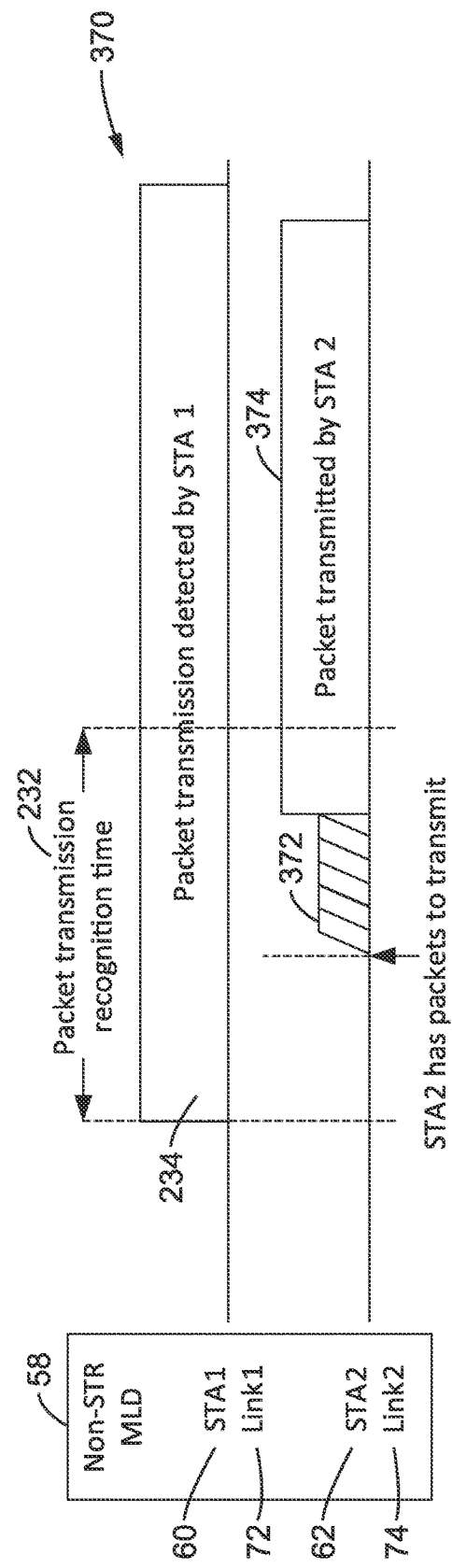
FIG. 36 is a communications sequence diagram with an example of a non-STR MLD initializing backoff on Link2 during the packet transmission recognition time on Link1 according to at least one embodiment of the present disclosure.

FIG. 36 illustrates an example embodiment 370 of a non-STR MLD initializing backoff on Link2 during the packet transmission recognition time on Link1.

As in the previous examples, the non-STR MLD 58 is shown with STA1 60 and STA2 62, communicating overs Link1 72 and Link2 74.

STA1 detects a packet transmission 234 on Link1. Before it obtains the information of the intended receiver of the packet transmission on Link1, STA2 has packets to transmit and plans to initialize backoff on Link2. As explained for block 118 in FIG. 23, STA2 can be allowed to initiate backoff 372 on Link2 during the recognition time on Link1. As shown in this example, STA2 initializes and counts down the backoff on Link2 once it has packets to transmit during the recognition time on Link1. If the backoff counts down to zero on Link2 during the recognition time on Link1, it can transmit the packet 374 on Link2 as in a single link scenario, which was explained for block 160 of FIG. 25.

Figure 37:
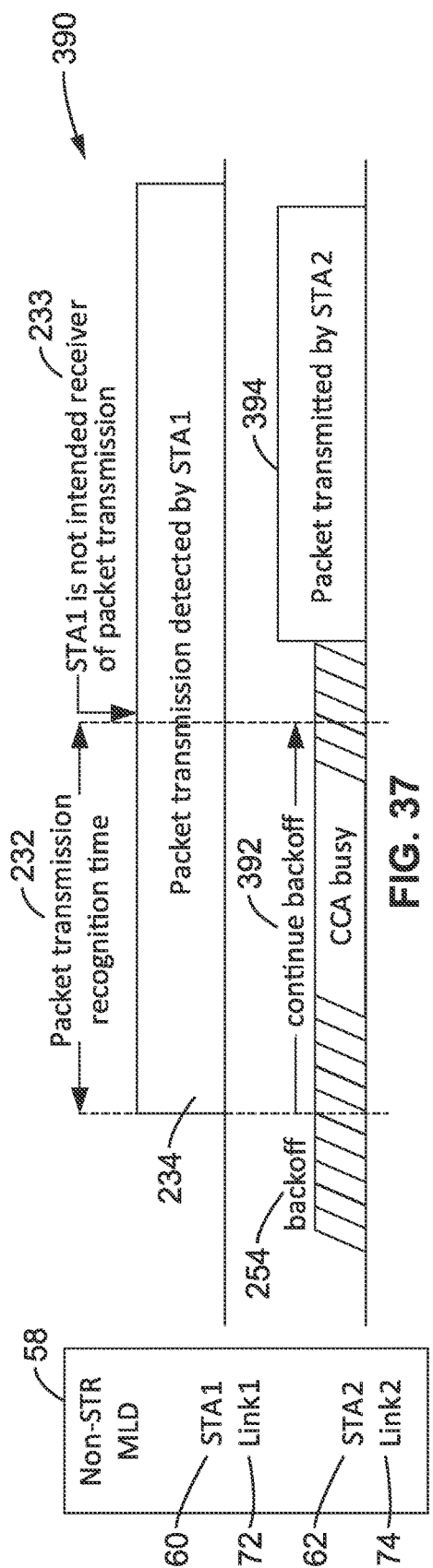
FIG. 37 is a communications sequence diagram with an example of a non-STR MLD continuing backoff on Link2 during the packet transmission recognition time on Link1 according to at least one embodiment of the present disclosure.

FIG. 37 illustrates an example embodiment 390 of a non-STR MLD continuing backoff on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 252 on Link2. Before it obtains the information of the intended receiver of the packet transmission on Link1, STA2 could continue 412 counting down backoff on Link2 during the recognition time 232 on Link1 as explained for blocks 132 and 134 in FIG. 24. After the end of the recognition time then STA1 recognizes 233 it is not the intended receiver of the packet transmission on Link1, so STA2 is allowed to keep contending 392 for the channel as explained for block 199 in FIG. 27. When the backoff counts down to zero on Link2, it can transmit packets 394 on Link2.

Figure 38:
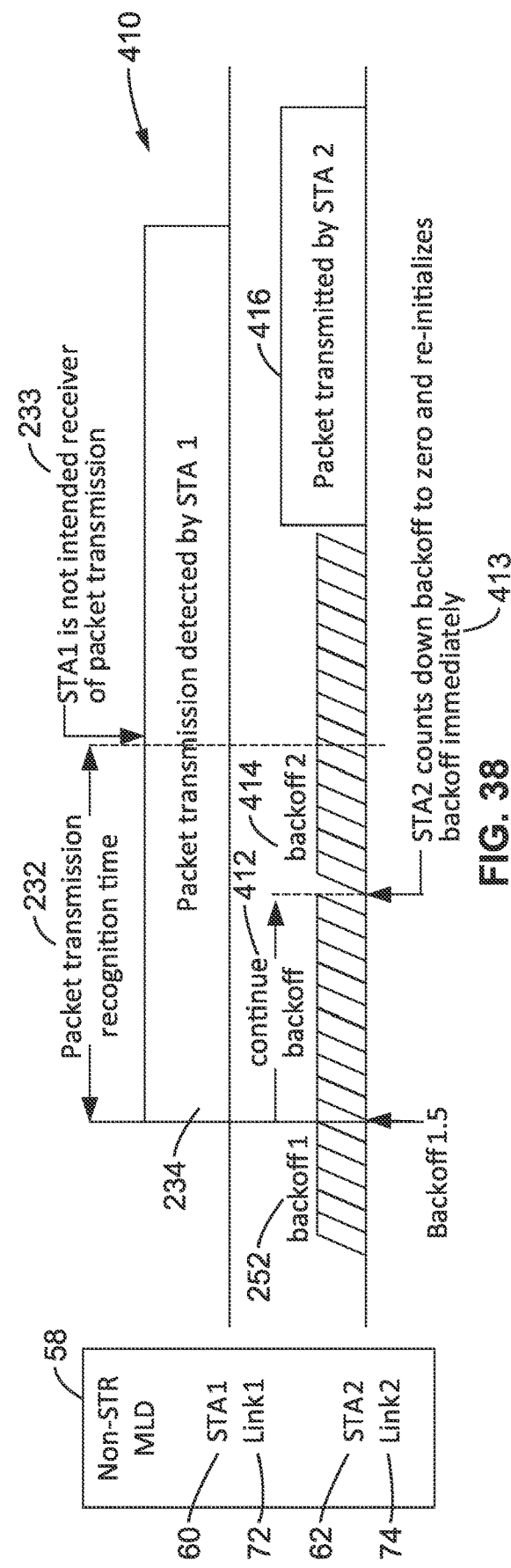
FIG. 38 is a communications sequence diagram with an example of a non-STR MLD re-initializing backoff immediately on Link2 when backoff counts down to zero on Link2 during the packet transmission recognition time on Link1 according to at least one embodiment of the present disclosure.

FIG. 38 illustrates an example embodiment 410 of a non-STR MLD re-initializing backoff immediately on Link2 when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 252 on Link2. Before it obtains the information of the intended receiver of the packet transmission on Link1, STA2 can continue counting down backoff 412, i.e., backoff1, on Link2 during the recognition time 232 on Link1 as explained for blocks 132 and 134 for FIG. 24. It is possible that the backoff on Link2 counts down to zero during the recognition time on Link1. As explained for block 156 in FIG. 25 and block 118 of FIG. 23, STA2 can re-initialize 413 and count down the backoff 414, i.e., backoff2, immediately. At the end of the recognition time, STA1 recognizes 233 it is not the intended receiver of the packet transmission on Link1. Then, STA2 can keep contending for the channel as explained for block 199 in FIG. 27. When the backoff counts down to zero on Link2, it can transmit packets 416 on Link2.

Backoff2 can be initialized by one of the following options.

When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning of recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 39 illustrates an example embodiment 430 as a second example of non-STR MLD re-initializing backoff immediately on Link2 when the backoff counts down to zero on Link2 during the recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is not counting down backoff on Link2. However, before it obtains the information of the intended receiver of the packet transmission on Link1, STA2 has a packet to transmit and initializes a backoff 432, i.e., backoff1, on Link2 during the recognition time 232 on Link1 as explained for block 118 in FIG. 23. It is possible that the backoff on Link2 counts down to zero during the recognition time on Link1. As explained for block 156 in FIG. 25 and for block 118 in FIG. 23, STA2 can re-initialize 433 and counts down the backoff 434, i.e., backoff2, immediately. At the end of the recognition time on Link1, STA1 recognizes 233 it is not the intended receiver of the packet transmission on Link1. Then, STA2 can keep contending 434 for the channel as explained for block 199 in FIG. 27. When the backoff counts down to zero on Link2, it can transmit packets 436 on Link2.

Backoff2 can be initialized by one of the following options.

When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

FIG. 40 illustrates an example embodiment 450 of a third example of a non-STR MLD re-initializing backoff immediately on Link2 when backoff counts down to zero on Link2 during the recognition time on Link1.

As in the previous examples, the non-STR MLD 58 is shown with STA1 60 and STA2 62, communicating overs Link1 72 and Link2 74.

When STA1 detects a packet transmission 232 on Link1, STA2 is counting down backoff 252 on Link2. STA2 can continue counting down backoff 412, i.e., backoff1, on Link2 during the recognition time on Link1 as explained for blocks 132 and 134 for FIG. 24. It is possible that the backoff on Link2 counts down to zero during the recognition time on Link1. As explained for block 156 for FIG. 25 and block 118 of FIG. 23, STA2 can re-initialize 451 and counts down the backoff 434, i.e., backoff2, immediately. At the end of the recognition time 232, STA1 recognizes 311 it is the intended receiver of the packet transmission on Link1, STA2 can pause 452 contending for the channel until STA1 finishes receiving the packet on Link1 (including the solicited transmission such as ACK, BA, etc.) as explained for block 198 of FIG. 27. When the backoff 454 counts down to zero on Link2, it can transmit the packets 456 on Link2.

Backoff2 can be initialized by one of the following options.

When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 41 illustrates an example embodiment 470 as a fourth example of non-STR MLD re-initializing backoff immediately on Link2 when backoff counts down to zero on Link2 during the recognition time on Link1.

As in the previous examples, the non-STR MLD 58 is shown with STA1 60 and STA2 62, communicating over Link1 72 and Link2 74.

When STA1 detects a packet transmission 232 on Link1, STA2 is counting down backoff 432 on Link2. STA2 can continue 412 counting down backoff, i.e., backoff1, on Link2 during the recognition time 232 on Link1 as explained for blocks 132 and 134 of FIG. 24. It is possible that the backoff on Link2 counts down to zero during the recognition time on Link1. As explained for block 156 of FIG. 25 and block 118 of FIG. 23, STA2 can re-initialize 471 and counts down the backoff 434, i.e., backoff2, immediately. At the end of the recognition time, STA1 recognizes it may be the intended receiver 331 of the packet transmission on Link1, STA2 can pause 472 contending for the channel until STA1 confirms whether it is the intended receiver of the packet transmission on Link1 as explained for block 196 of FIG. 27. In this example, when STA1 confirms that it is not the intended receiver 233 of the packet transmission on Link1, STA2 continues 474 counting down backoff on Link2 as explained for block 199 of FIG. 27. When the backoff counts down to zero on Link2, STA2 can transmit packets 476 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 42 illustrates an example embodiment 490 as a fifth example of a non-STR MLD re-initializing backoff immediately on Link2 when backoff counts down to zero on Link2 during the recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. STA2 can continue counting down backoff 412, i.e., backoff1, on Link2 during the recognition time on Link1 as explained for block 132 and 134 for FIG. 24. It is possible that the backoff on Link2 counts down to zero during the recognition time on Link1. As explained for block 156 for FIG. 25 and for block 118 of FIG. 23, STA2 can re-initialize (reset) 471 and counts down the backoff 434, i.e., backoff2, immediately. At the end of the recognition time, STA1 recognizes 492 it may be the intended receiver of the packet transmission on Link1, STA2 can pause contending 472 the channel until STA1 confirms whether it is the intended receiver of the packet transmission on Link1 as explained for block 196 for FIG. 27. In this example, STA1 then confirms that it is the intended receiver 311 of the packet transmission on Link1. STA2 keeps pausing 472 counting down backoff on Link2 after STA1 finishes receiving the packet on Link1 (including the solicited transmission such as ACK, BA, etc.) as explained for block 198 of FIG. 27. When the backoff 494 counts down to zero on Link2, STA2 can transmit the packets 496 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 43 illustrates an example embodiment 510 of a non-STR MLD deferring backoff re-initialization on Link2 when backoff counts down to zero on Link2 during the recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. STA2 can continue 412 counting down backoff, i.e., backoff1, on Link2 during the recognition time on Link1 as explained for blocks 132 and 134 for FIG. 24. It is possible that the backoff on Link2 counts down to zero 512 but it does not access the channel during the recognition time on Link1. As explained for block 156 for FIG. 25 and block 116 for FIG. 23 and block 199 for FIG. 27, STA2 can re-initialize 514 and counts down the backoff 518, i.e., backoff2 after STA1 recognizes 233 that it is not the intended receiver of the packet transmission on Link1. When the backoff 518 counts down to zero on Link2, STA2 can transmit the packets 520 on Link2.

Backoff2 can be initialized by one of the following options.

When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 44 illustrates an example embodiment 530 a second example of non-STR MLD deferring backoff re-initialization on Link2 when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is not counting down backoff on Link2. However, STA2 has a packet to transmit and initializes a backoff 432, i.e., backoff1, on Link2 during the recognition time 232 on Link1 as explained for block 118 for FIG. 23. It is possible that the backoff on Link2 counts down to zero 532 during the recognition time on Link1, but does not access the channel. As explained for block 156 for FIG. 25, and block 116 for FIG. 23, and block 199 for FIG. 27, STA2 can re-initialize 534 and counts down the backoff 536, i.e., backoff2, after STA1 recognizes 233 that it is not the intended receiver of the packet transmission on Link1. When the backoff 536 counts down to zero on Link2, STA2 can transmit the packets 538 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

FIG. 45 illustrates an example embodiment 550 of a third example of a non-STR MLD deferring backoff re-initialization on Link2 when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. Before it recognizes whether it is the intended receiver of the packet transmission on Link1, STA2 can continue 412 counting down backoff, i.e., backoff1, on Link2 during the recognition time 232 on Link1 as explained for blocks 132 and 134 in FIG. 24. It is possible that the backoff on Link2 counts down to zero 552 during the recognition time on Link1, but it does not access the channel.

As explained for block 156 for FIG. 25 and block 116 of FIG. 23, STA2 does not re-initialize 552 or count down the backoff, i.e., backoff2, until the end of the recognition time of the packet transmission on Link1. However, STA1 recognizes it is the intended receiver 311 of the packet transmission on Link1 at the end of the recognition time 232 on Link1. STA2 further defers 472 to count down backoff2 until STA1 finishes receiving the packet (including the solicited transmission such as ACK, BA, etc.) on Link1 as explained for block 198 for FIG. 27. STA2 the re-initializes 554 the backoff 556 and counts down to zero on Link2, whereas STA2 can then transmit packets 558 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

FIG. 46 illustrates an example embodiment 570 of a fourth example of non-STR MLD deferring backoff re-initialization on Link2 when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. Before it recognizes whether it is the intended receiver of the packet transmission on Link1, STA2 can continue 412 counting down backoff, i.e., backoff1, on Link2 during the recognition time 232 on Link1 as explained for blocks 132 and 134 for FIG. 24. It is possible that the backoff on Link2 counts down to zero 572 during the recognition time on Link1, but it does not access the channel.

As explained for block 156 for FIG. 25 and block 116 for FIG. 23, STA2 does not re-initialize 572 or count down the backoff, i.e., backoff2, until the end of the recognition time 232 of the packet transmission on Link1. However, STA1 recognizes it may be the intended receiver 331 of the packet transmission on Link1 at the end of the recognition time on Link1. STA2 defers to count down backoff2 until it confirms whether it is the intended receiver on Link2 as explained for block 199 for FIG. 27. In this example, STA2 is the intended receiver on Link2, it further defers 472 to count down backoff2 until STA1 finishes receiving the packet (including the solicited transmission such as ACK, BA, etc.) on Link1 as explained for blocks 198 for FIG. 27. Then, STA2 re-initializes 574 backoff 576 and counts down to zero on Link2, and transmits packets 578 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and sets it to 5 backoff slots.

Figure 47:
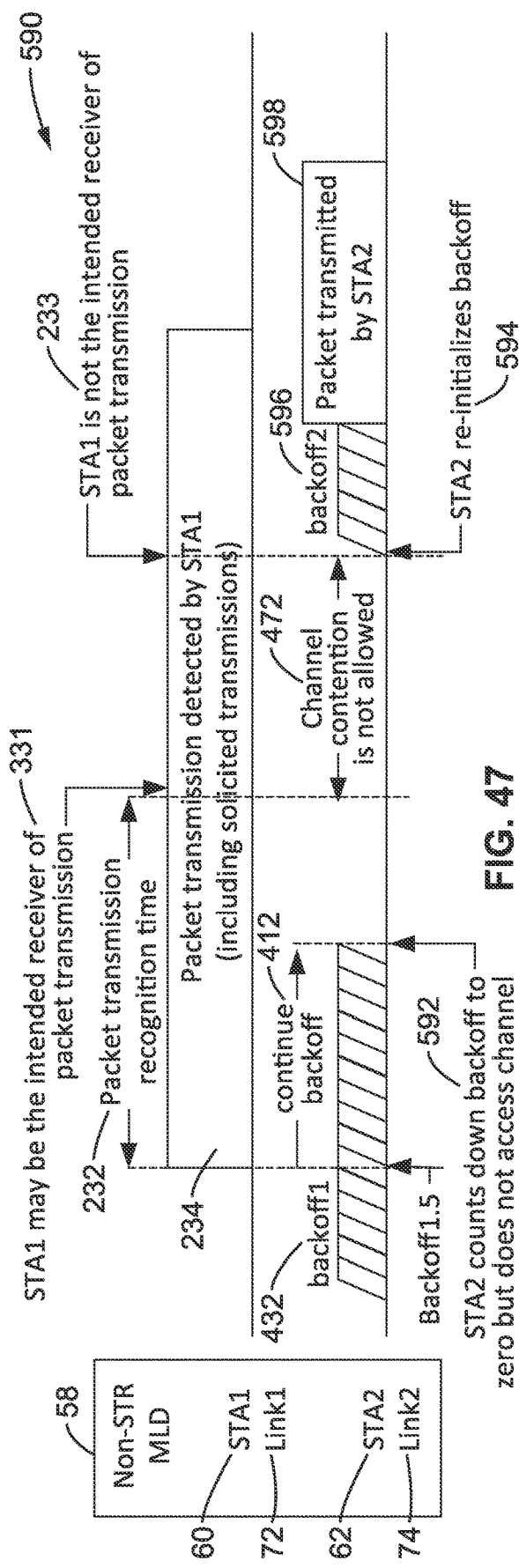
FIG. 47 is a communications sequence diagram with a fifth example of non-STR MLD deferring backoff re-initialization on Link2 when backoff counts down to zero on Link2 during the packet transmission recognition time on Link1 according to at least one embodiment of the present disclosure.

FIG. 47 illustrates an example embodiment 590 as a fifth example of a non-STR MLD deferring backoff re-initialization on Link2 when the backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. Before it recognizes whether it is the intended receiver of the packet transmission on Link1, STA2 can continue counting down backoff 412, i.e., backoff1, on Link2 during the recognition time 232 on Link1 as explained for blocks 132 and 134 for FIG. 24. It is possible that the backoff on Link2 counts down to zero 592 during the recognition time on Link1, but the STA does not access the channel. As explained for block 156 for FIG. 25 and block 116 for FIG. 23, STA2 does not re-initialize 592 or count down the backoff, i.e., backoff2, until the end of the recognition time of the packet transmission on Link1. However, STA1 recognizes it may be the intended receiver 331 of the packet transmission on Link1 at the end of the recognition time on Link1. STA2 defers 472 to count down backoff2 until it confirms whether it is the intended receiver on Link2 as explained for block 199 for FIG. 27. In this example, when STA2 recognizes 233 it is not the intended receiver on Link2, and it re-initializes 594 and continues counting down backoff2 596 as explained for block 199 for FIG. 27. Then, upon the backoff count reaching zero for Link2, STA2 can transmit packets 598 on Link2.

Backoff2 can be initialized by one of the following options. When backoff2 is initialized, it is possible that STA2 does not update the CW. That is, the CWs for initializing backoff1 and initializing backoff2 are the same. If backoff1 is a random value chosen between 0 and CW, then backoff2 is also chosen randomly between 0 and CW as defined in CSMA/CA.

When backoff2 is initialized, STA2 can regard it as the occurrence of an internal collision as defined in IEEE 802.11. The CW of backoff2 on Link2 can be updated as an internal collision occurs.

When backoff2 is initialized, STA2 can set backoff2 to backoff1.5, where backoff1.5 is the backoff counter value at the beginning time of the recognition time on Link1. That is, backoff1 counts down to backoff1.5 at the beginning of recognition time on Link1. For example, backoff1 is initialized and set to 10 backoff slots. It counts down to backoff1.5=5 backoff slots at the beginning of the recognition time on Link1. Then, backoff2 is initialized and set to 5 backoff slots.

Figure 48:
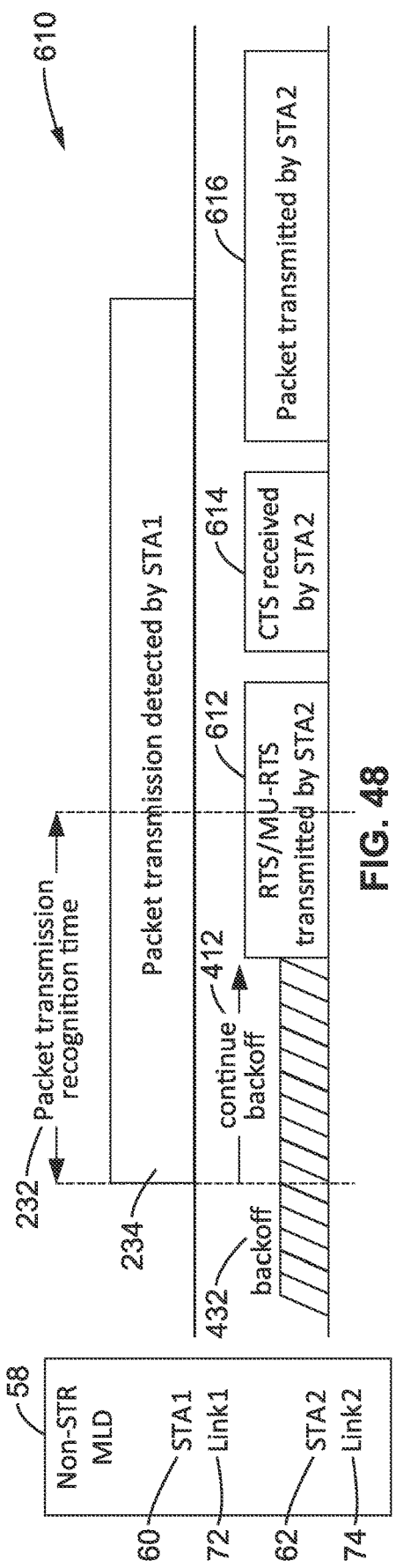
FIG. 48 is a communications sequence diagram with an example of a non-STR MLD accessing the channel on Link2 by successful Multi-User (MU) RTS/CTS exchange when backoff counts down to zero on Link2 during the packet transmission recognition time on Link1 according to at least one embodiment of the present disclosure.

FIG. 48 illustrates an example embodiment 610 of a non-STR MLD accessing the channel on Link2 by successful (MU) RTS/CTS exchange when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. STA2 can continue 412 counting down backoff on Link2 during the recognition time on Link1 as explained for blocks 132 and 134 for FIG. 24. It is possible that the backoff on Link2 counts down to zero during the recognition time on Link1. As explained for block 158 for FIG. 25, STA2 can send a RTS/MU-RTS frame 612 to attempt to access the channel on Link2. If it receives the CTS 614 before the timeout, then STA2 accesses the channel on Link2 successfully with packets transmitted 616. It should be noted that the CTS can be sent following the rule as explained for blocks 174 and 178 in FIG. 26.

Figure 49:
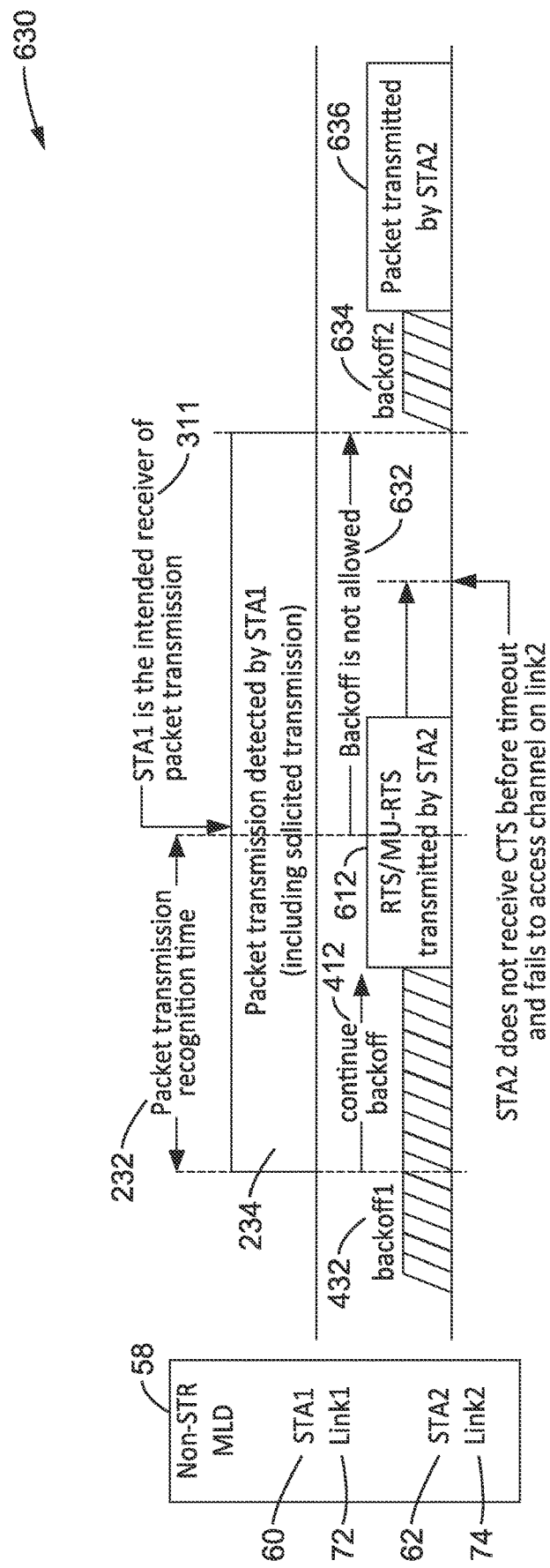
FIG. 49 is a communications sequence diagram with an example of a non-STR MLD failing to access the channel on Link2 due to unsuccessful (MU) RTS/CTS exchange when backoff counts down to zero on Link2 during the packet transmission recognition time on Link1 according to at least one embodiment of the present disclosure.

FIG. 49 illustrates an example embodiment 630 with a first example of a non-STR MLD failing to access the channel on Link2 due to an unsuccessful (MU) RTS/CTS exchange when the backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432, i.e., backoff1, on Link2. STA2 can continue 412 counting down backoff1 on Link2 during the recognition time 232 on Link1 as explained for blocks 132 and 134 for FIG. 24. It is possible that the backoff1 on Link2 counts down to zero during the recognition time on Link1. As explained for block 158 in FIG. 25, STA2 can send a RTS/MU-RTS frame 612 to attempt to access the channel on Link2. If it does not receive the CTS before the timeout, it fails to access the channel on Link2 with backoff not allowed 632.

As shown in the example, if STA1 recognizes 311 it is the intended receiver of the packet transmission at the end of the recognition time, then STA2 should wait to re-initialize backoff2 until after STA1 finishes receiving the packet (including the solicited transmission such as ACK, BA, etc.) on Link1. After STA1 completes packet reception, then STA2 re-initializes backoff 634, and when backoff2 is counted down to zero on Link2, it can transmit packets 636 on Link2.

It should be appreciated that the STA which is the receiver of the RTS/MU-RTS may not send CTS as explained for blocks 174 and 178 for FIG. 26.

Figure 50:
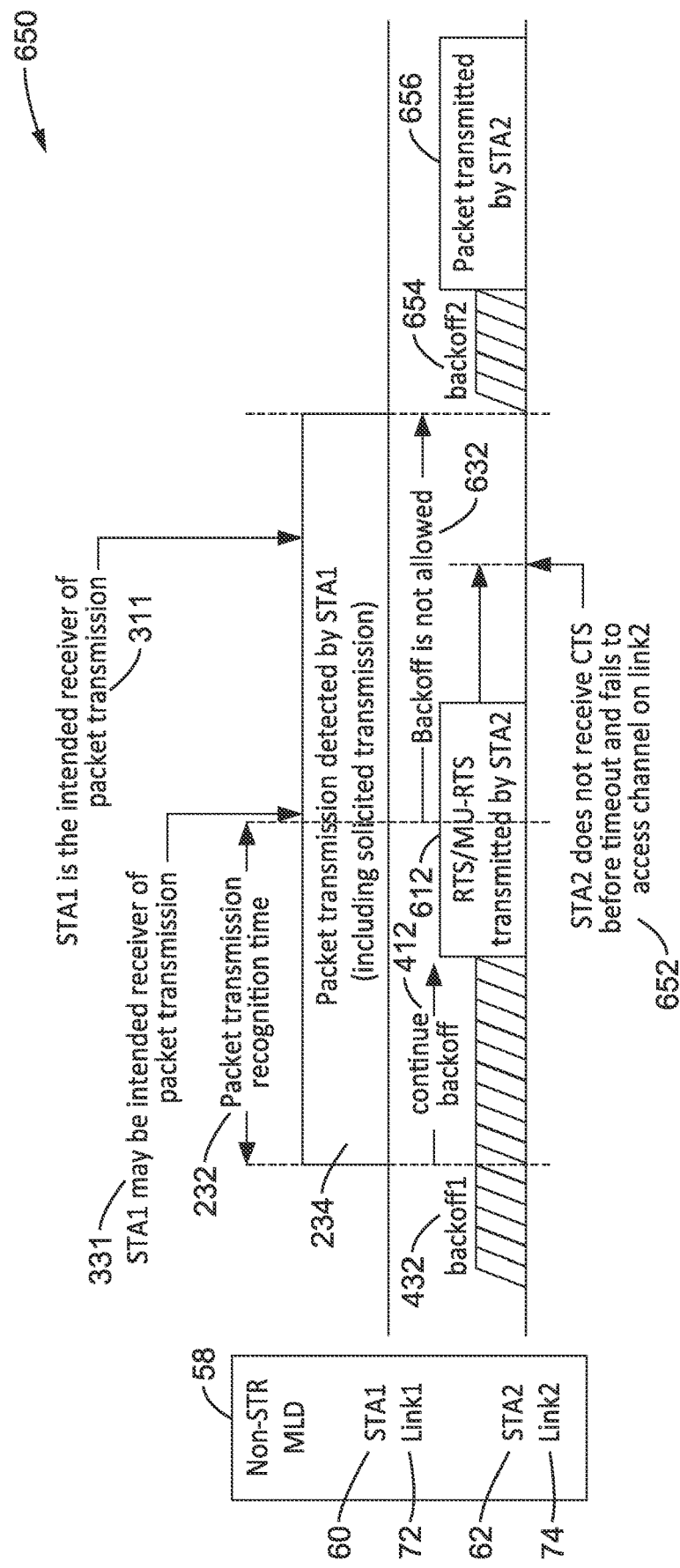
FIG. 50 is a communications sequence diagram with an example of a non-STR MLD failing to access the channel on Link2 due to unsuccessful (MU) RTS/CTS exchange when backoff counts down to zero on Link2 during the packet transmission recognition time on Link1 according to at least one embodiment of the present disclosure.

FIG. 50 illustrates an example embodiment 650 with a second example of a non-STR MLD failing to access the channel on Link2 due to unsuccessful (MU) RTS/CTS exchange when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432, i.e., backoff1, on Link2. STA2 can continue 412 counting down backoff1 on Link2 during the recognition time 232 on Link1 as explained for blocks 132 and 134 for FIG. 24. It is possible that backoff1 on Link2 counts down to zero during the recognition time on Link1. As explained for block 158 for FIG. 25, STA2 can send an RTS/MU-RTS frame 612 as shown to attempt to access the channel on Link2. If it does not receive 652 the CTS before the timeout, it fails to access the channel on Link2 as backoff is not allowed 632.

In the example STA1 recognizes it may 331 be the intended receiver of the packet transmission at the end of the recognition time, so STA2 defers to re-initialize the backoff until STA1 confirms whether it is the intended receiver on Link1 as explained for block 196 for FIG. 27. Then, STA1 confirms it is the intended receiver 311 of the packet transmission on Link1 and STA2 waits 632 to re-initialize backoff2 654 after STA1 finishes receiving the packet (including the solicited transmission such as ACK, BA, etc.) on Link1 as explained for block 198 for FIG. 27. When backoff2 has counted down to zero on Link2, then STA2 can transmit packets 656 on Link2.

It should be recognized that the STA which is the receiver of the RTS/MU-RTS may not send a CTS as explained for blocks 174 and 178 for FIG. 26.

Figure 51:
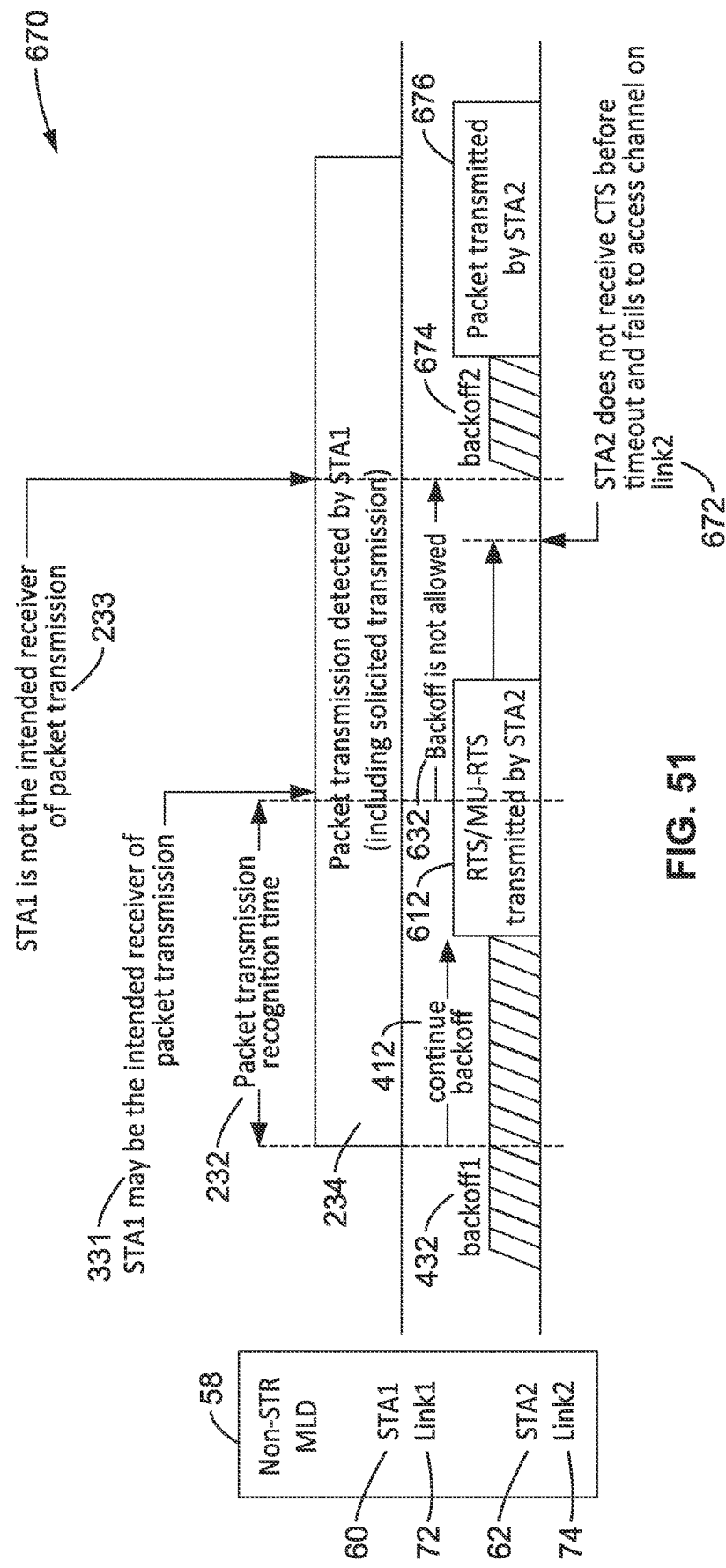
FIG. 51 is a communications sequence diagram with a third example of a non-STR MLD failing to access the channel on Link2 due to an unsuccessful (MU) RTS/CTS exchange when backoff counts down to zero on Link2 during the packet transmission recognition time on Link1 according to at least one embodiment of the present disclosure.

FIG. 51 illustrates an example embodiment 670 with a third example of a non-STR MLD failing to access the channel on Link2 due to unsuccessful (MU) RTS/CTS exchange when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432, i.e., backoff1, on Link2. STA2 can continue 412 counting down backoff1 on Link2 during the recognition time 232 on Link1 as explained for blocks 132 and 134 for FIG. 24. It is possible that the backoff1 on Link2 counts down to zero during the recognition time on Link1. As explained for block 158 for FIG. 25, STA2 can send an RTS/MU-RTS frame 612 to attempt to access the channel on Link2. If it does not receive the CTS before the timeout, it fails 672 to access the channel on Link2, and should re-initialize the backoff, i.e., backoff2.

As shown in the example, if STA1 recognizes it may 331 be the intended receiver of the packet transmission at the end of the recognition time, STA2 defers 632 to re-initialize the backoff until STA1 confirms whether it is the intended receiver on Link1 as explained for block 196 for FIG. 27. When STA1 confirms 233 it is not the intended receiver of the packet transmission on Link1, STA2 can then re-initialize backoff2 674 as explained for block 199 for FIG. 27. When backoff2 counts down to zero on Link2, then STA2 can transmit packets 676 on Link2.

Figure 52:
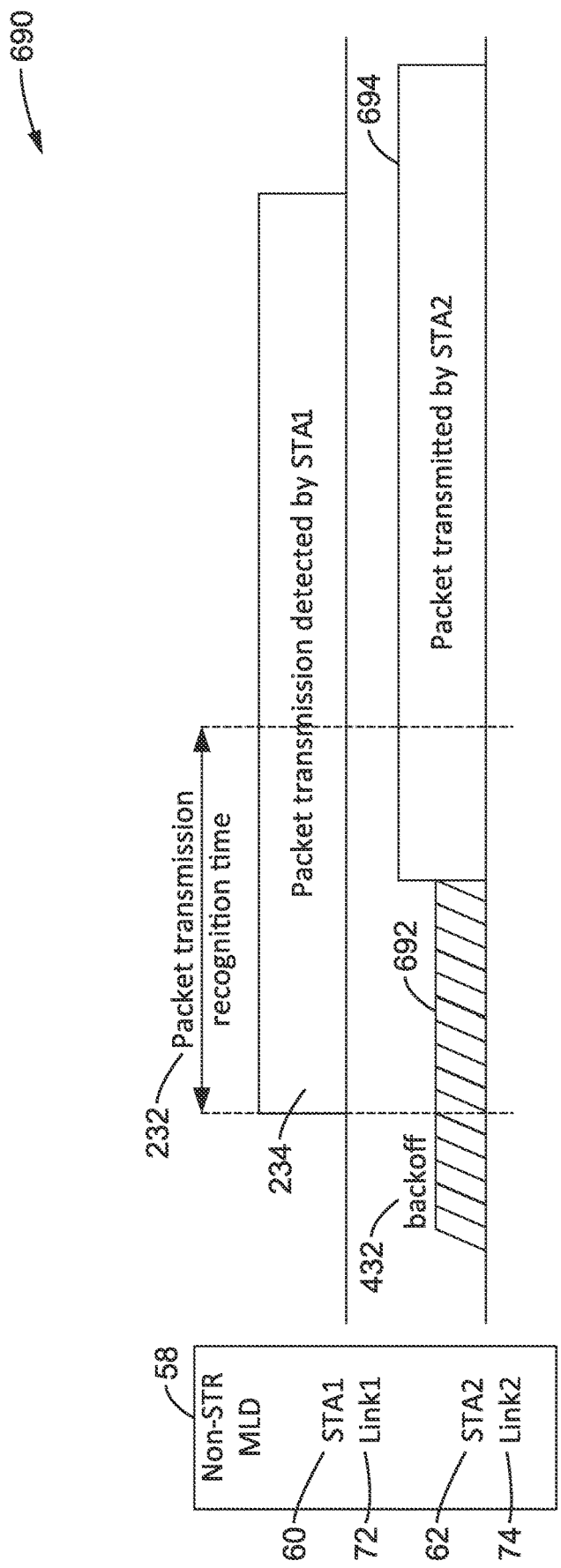
FIG. 52 is a communications sequence diagram with an example of a non-STR MLD accessing the channel on Link2 directly when backoff counts down to zero on Link2 during the packet transmission recognition time on Link1 according to at least one embodiment of the present disclosure.

FIG. 52 illustrates an example embodiment 690 with an example of a non-STR MLD accessing the channel on Link2 directly when backoff counts down to zero on Link2 during the packet transmission recognition time on Link1.

As in the previous examples, the non-STR MLD 58 is shown with STA1 60 and STA2 62, communicating overs Link1 72 and Link2 74.

When STA1 detects a packet transmission 234 on Link1, STA2 is counting down backoff 432 on Link2. STA2 can continue 692 counting down backoff on Link2 during the recognition time 232 on Link1 as explained for blocks 132 and 134 for FIG. 24. It is possible that the backoff on Link2 counts down to zero during the recognition time on Link1. As explained for block 160 for FIG. 25, STA2 can access the channel to transmit packets 694 on Link2 as in a single link scenario.

5. General Scope of Implementations

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed; (b) a processor coupled to said MLD; (c) a non-transitory memory storing instructions executable by the processor; and (d) wherein said instructions, when executed by the processor, perform a communications protocol for said MLD and other stations and other MLDs on the wireless network, so that said MLD receiving on a first link can be interfered with by transmission on a second link, whereas recognition time is required to determine whether it is the intended receiver of the packet transmission detected on the first link, comprising steps wherein: (d)(i) the MLD does not contend for the channel on said second link during the recognition time of a packet it is detecting on the first link; (d)(ii) the MLD starts contending for the channel on the second link during the packet transmission time on the first link after recognizing it is not the intended receiver of the packet on the first link; and (d)(iii) the MLD does not contend for the channel on the second link until packet transmission on the first link ends, if it is determined that the MLD is the intended receiver of the packet transmission on the first link.

An apparatus for wireless communication in a network, the apparatus comprising: (a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed; (b) a processor coupled to said MLD; (c) a non-transitory memory storing instructions executable by the processor; and (d) wherein said instructions, when executed by the processor, perform a communications protocol for said MLD and other stations and other MLDs on the wireless network, so that said MLD receiving on a first link can be interfered with by transmission on a second link, requires packet transmission recognition time to determine whether it is the intended receiver of the packet transmission detected on the first link, comprising steps wherein: (d)(i) the MLD contends for the channel on a second link during the recognition time of a packet transmission it has detected on a first link; (d)(ii) the MLD accesses the channel on the second link when the backoff counts down to zero during the packet transmission recognition time on the first link; and (d)(iii) the MLD contends for the channel on the second link during the transmission time of the packet on the first link after determining that it is not the intended receiver of the packet transmission on the first link.

An apparatus for wireless communication in a network, the apparatus comprising: (a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed; (b) a processor coupled to said MLD; (c) a non-transitory memory storing instructions executable by the processor; and (d) wherein said instructions, when executed by the processor, perform a communications protocol for said MLD and other stations and other MLDs on the wireless network, so that said MLD receiving on a first link can be interfered with by transmission on a second link, requires recognition time to determine whether it is the intended receiver of the packet transmission detected on the first link, comprising steps wherein: (d)(i) the MLD contends for the channel on a second link during the recognition time of a packet transmission it detects on a first link; and (d)(ii) the MLD does not access the channel on the second link and reinitializes backoff on the second link when the backoff counts down to zero during the packet transmission recognition time on the first link.

A wireless communication system/apparatus performing transmission of packets, where CSMA/CA and multi-link operation are applied, the MLD receiving on one link, denoted by link1, is interfered by its transmitting on one link, denoted by link2, MLD needs recognition time to recognize whether it is the intended receiver of the packet transmission detected on one link, comprising: (a) the MLD does not contend the channel on link2 during the recognition time of a packet it detects on link1; (b) the MLD contends the channel on link2 during the transmission time of the packet on link1 after recognizing it is not the intended receiver of the packet on link1; and (c) the MLD does not contend the channel on link2 till the packet transmission on link1 ends if MLD is the intended receiver of the packet transmission on link1.

A wireless communication system/apparatus performing transmission of packets, where CSMA/CA and multi-link operation are applied, the MLD receiving on one link, denoted by link1, is interfered by its transmitting on one link, denoted by link2, MLD needs packet transmission recognition time to recognize whether it is the intended receiver of the packet transmission detected on one link, comprising: (a) wherein MLD contends the channel on link2 during the recognition time of a packet transmission it detects on link1; (b) wherein the MLD accesses the channel on link2 when the backoff counts down to zero during the packet transmission recognition time on link1; (c) wherein the MLD contends the channel on link2 during the transmission time of the packet on link1 after recognizing it is not the intended receiver of the packet on link1; and (d) wherein the MLD does not contend the channel on link2 till the packet transmission on link1 ends if MLD is the intended receiver of the packet transmission on link1.

A wireless communication system/apparatus performing transmission of packets, where CSMA/CA and multi-link operation are applied, the MLD receiving on one link, denoted by link1, is interfered by its transmitting on one link, denoted by link2, MLD needs packet transmission recognition time to recognize whether it is the intended receiver of the packet transmission detected on one link, comprising: (a) the MLD contends the channel on link2 during the recognition time of a packet transmission it detects on link1; (b) the MLD does not access the channel and reinitializes the backoff on link2 when the backoff counts down to zero during the packet transmission recognition time on link1; (c) the MLD contends the channel on link2 during the transmission time of the packet on link1 after recognizing it is not the intended receiver of the packet on link1; and (d) the MLD does not contend the channel on link2 till the packet transmission on link1 ends if MLD is the intended receiver of the packet transmission on link1.

The apparatus or system of any preceding claim, wherein said MLD not contending for the channel on said second link during the recognition time of a packet transmission it detects on said first link, said MLD continues monitoring channel conditions on said second link.

The apparatus or system of any preceding claim, wherein when said MLD is not contending for the channel on said second link during the recognition time of a packet transmission it detects on said first link, said MLD sets NAV according to the packet detected on said second link.

The apparatus or system of any preceding claim, wherein the MLD does not contend for the channel on the second link until the packet transmission on the first link ends in the case of the MLD being the intended receiver of the packet transmission on the first link.

The apparatus or system of any preceding claim, wherein the MLD contending for the channel on the second link during the recognition time of a packet transmission it detects on the first link can forbid backoff initialization or backoff re-initialization during that time.

The apparatus or system of any preceding claim, wherein the MLD contending for the channel on the second link during the recognition time of a packet transmission it detects on the first link only allows continuing backoff count-downs which were started before the recognition time on the first link.

The apparatus or system of any preceding claim, wherein the MLD accessing the channel on the second link during the packet transmission recognition time on the first link can access the channel as in the single link scenario.

The apparatus or system of any preceding claim, wherein the MLD accessing the channel on the second link during the packet transmission recognition time on the first link transmits an RTS or MU-RTS frame to attempt obtaining the TXOP.

The apparatus or system of any preceding claim, wherein the MLD contends for the channel on the second link during the transmission time of the packet on the first link after recognizing that it is not the intended receiver of the packet on the first link.

The apparatus or system of any preceding claim, wherein the MLD does not contend for the channel on the second link until the packet transmission on the first link has ended, in a situation where the MLD is the intended receiver of packet transmissions on the first link.

The apparatus or system of any preceding claim, wherein the MLD contending for the channel on the second link, during the recognition time of a packet transmission it detected on the first link, can forbid backoff initialization or backoff re-initialization on the second link during that time.

The apparatus or system of any preceding claim, wherein the MLD contending for the channel on the second link, during the recognition time of a packet transmission it detected on the first link, only allows continuation of a backoff count-down which was started before the recognition time on the first link.

The apparatus or system of any preceding claim, wherein the MLD which is not accessing the channel on the second link, at the time its backoff counts down to zero during the packet transmission recognition time on the first link re-initializes its backoff immediately.

The apparatus or system of any preceding claim, wherein the MLD, which is not accessing the channel on the second link at the time its backoff counts down to zero during the packet transmission recognition time on the first link, waits to re-initialize the backoff until the end of recognition time of the first link.

The apparatus or system of any preceding claim, wherein the MLD, which is not accessing the channel on the second link at the time its backoff counts down to zero during the packet transmission recognition time on the first link, regards this as an internal collision as defined in the EDCA of IEEE 802.11 for the second link.

The apparatus or system of any preceding claim, wherein the MLD, which is not accessing the channel on the second link at the time its backoff counts down to zero during the packet transmission recognition time on the first link, reinitiates the backoff counter with Contention-Window (CW) doubled if it does not reach the maximum CW size for the second link.

The apparatus or system of any preceding claim, wherein the MLD, which is not accessing the channel on the second link when the backoff counts down to zero during the packet transmission recognition time on the first link, is prevented from changing the Contention-Window (CW) on the second link.

The apparatus or system of any preceding claim, wherein the MLD, which is not accessing the channel on the second link when the backoff counts down to zero during the packet transmission recognition time on the first link, performs resetting the backoff counter on the first link to its value at a beginning time of the detected packet transmission on the first link.

The apparatus or system of any preceding claim, wherein the MLD contending the channel on link2 during the recognition time of a packet transmission it detects on link1 could forbid the backoff initialization or backoff re-initialization during that time.

The apparatus or system of any preceding claim, wherein the MLD contending the channel on link2 during the recognition time of a packet transmission it detects on link1 could only allow to continue the backoff count-down started before the recognition time on link1.

The apparatus or system of any preceding claim, wherein the MLD accessing the channel on link2 during the packet transmission recognition time on link1 could access the channel as in the single link scenario.

The apparatus or system of any preceding claim, wherein the MLD accessing the channel on link2 during the packet transmission recognition time on link1 could transmit RTS or MU-RTS frame to attempt obtaining the TXOP.

The apparatus or system of any preceding claim, wherein the MLD contending the channel on link2 during the recognition time of a packet transmission it detects on link1 could forbid the backoff initialization or backoff re-initialization during that time.

The apparatus or system of any preceding claim, wherein the MLD contending the channel on link2 during the recognition time of a packet transmission it detects on link1 could only allow to continue the backoff count-down started before the recognition time on link1.

The apparatus or system of any preceding claim, wherein the MLD not accessing the channel on link2 when the backoff counts down to zero during the packet transmission recognition time on link1 could re-initialize the backoff immediately.

The apparatus or system of any preceding claim, wherein the MLD not accessing the channel on link2 when the backoff counts down to zero during the packet transmission recognition time on link1 could wait to re-initialize the backoff until the end of recognition time of link1.

The apparatus or system of any preceding claim, wherein the MLD not accessing the channel on link2 when the backoff counts down to zero during the packet transmission recognition time on link1 could regard it as an internal collision as defined in IEEE 802.11 occurs on link2.

The apparatus or system of any preceding claim, wherein the MLD not accessing the channel on link2 when the backoff counts down to zero during the packet transmission recognition time on link1 could not change the CW on link2.

The apparatus or system of any preceding claim, wherein the MLD not accessing the channel on link2 when the backoff counts down to zero during the packet transmission recognition time on link1 could reset the backoff counter on link1 to its value at the beginning time of the detected packet transmission on link1.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| | | User Priority to Access Category (UP to AC) mapping | | |
|---|---|---|---|---|
| Priority | User Priority (UP) | IEEE 802.1D designation | Transmit queue | AC |
| Low | 1 | Background (BK) | BK | BK |
| ↓ | 2 | Spare (—) | BK | BK |
| | 0 | Best Effort (BE) | BE | BE |
| | 3 | Excellent Effort (EE) | BE | BE |

TABLE 1-continued

User Priority to Access Category (UP to AC) mapping

| Priority | User Priority (UP) | IEEE 802.1D designation | Transmit queue | AC |
|---|---|---|---|---|
| | 4 | Control Load (CL) | A_VI | VI |
| | 5 | Video (VI) | VI | VI |
| | 6 | Voice (VO) | VO | VO |
| High | 7 | Network Control (NC) | A_VO | VO |

TABLE 2

Default Parameter Settings for EDCA Channel Access

| AC | CWmin | CWmax | AIFSN | TXOP limit (mS) |
|---|---|---|---|---|
| BK | 15 | 1023 | 7 | 0 |
| BE | 15 | 1023 | 3 | 0 |
| VI | 7 | 15 | 2 or 1 (AP) | 3 |
| VO | 3 | 7 | 2 or 1 (AP) | 1.5 |

What is claimed is:

1. An apparatus for wireless communication in a network, the apparatus comprising:
  (a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed;
  (b) a processor coupled to said MLD;
  (c) a non-transitory memory storing instructions executable by the processor; and
  (d) wherein said instructions, when executed by the processor, perform a communications protocol for said MLD and other stations and other MLDs on the wireless network, so that said MLD receiving on a first link can be interfered with by transmission on a second link, whereas recognition time is required to determine whether it is the intended receiver of the packet transmission detected on the first link, comprising steps wherein:
    (i) the MLD does not contend for the channel on said second link during the recognition time of a packet it is detecting on the first link;
    (ii) the MLD starts contending for the channel on the second link during the packet transmission time on the first link after recognizing it is not the intended receiver of the packet on the first link; and
    (iii) the MLD does not contend for the channel on the second link until packet transmission on the first link ends, if it is determined that the MLD is the intended receiver of the packet transmission on the first link.

2. The apparatus of claim 1, wherein said MLD is not contending for the channel on said second link during the recognition time of a packet transmission it detects on said first link, said MLD continues monitoring channel conditions on said second link.

3. The apparatus of claim 1, wherein when said MLD is not contending for the channel on said second link during the recognition time of a packet transmission it detects on said first link, said MLD sets NAV according to the packet detected on said second link.

4. An apparatus for wireless communication in a network, the apparatus comprising:
  (a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed;
  (b) a processor coupled to said MLD;
  (c) a non-transitory memory storing instructions executable by the processor; and
  (d) wherein said instructions, when executed by the processor, perform a communications protocol for said MLD and other stations and other MLDs on the wireless network, so that said MLD receiving on a first link can be interfered with by transmission on a second link, requires packet transmission recognition time to determine whether it is the intended receiver of the packet transmission detected on the first link, comprising steps wherein:
    (i) the MLD contends for the channel on a second link during the recognition time of a packet transmission it has detected on a first link;
    (ii) the MLD accesses the channel on the second link when the backoff counts down to zero during the packet transmission recognition time on the first link; and
    (iii) the MLD contends for the channel on the second link during the transmission time of the packet on the first link after determining that it is not the intended receiver of the packet transmission on the first link.

5. The apparatus of claim 4, wherein the MLD does not contend for the channel on the second link until the packet transmission on the first link ends in the case of the MLD being the intended receiver of the packet transmission on the first link.

6. The apparatus of claim 4, wherein the MLD contending for the channel on the second link during the recognition time of a packet transmission it detects on the first link can forbid backoff initialization or backoff re-initialization during that time.

7. The apparatus of claim 4, wherein the MLD contending for the channel on the second link during the recognition time of a packet transmission it detects on the first link only allows continuing backoff count-downs which were started before the recognition time on the first link.

8. The apparatus of claim 4, wherein the MLD accessing the channel on the second link during the packet transmission recognition time on the first link can access the channel as in the single link scenario.

9. The apparatus of claim 4, wherein the MLD accessing the channel on the second link during the packet transmission recognition time on the first link transmits an RTS or MU-RTS frame to attempt obtaining the TXOP.

10. An apparatus for wireless communication in a network, the apparatus comprising:

(a) a wireless communication circuit configured as a multi-link device (MLD) controlling multiple links for wirelessly communicating with at least one other station or other MLD on a network using Carrier-Sense Multiple-Access Collision Avoidance (CSMA/CA) and where multi-link operations are performed;
(b) a processor coupled to said MLD;
(c) a non-transitory memory storing instructions executable by the processor; and
(d) wherein said instructions, when executed by the processor, perform a communications protocol for said MLD and other stations and other MLDs on the wireless network, so that said MLD receiving on a first link can be interfered with by transmission on a second link, requires recognition time to determine whether it is the intended receiver of the packet transmission detected on the first link, comprising steps wherein:
(i) the MLD contends for the channel on a second link during the recognition time of a packet transmission it detects on a first link; and
(ii) the MLD does not access the channel on the second link and reinitializes backoff on the second link when the backoff counts down to zero during the packet transmission recognition time on the first link.

11. The apparatus of claim 10, wherein the MLD contends for the channel on the second link during the transmission time of the packet on the first link after recognizing that it is not the intended receiver of the packet on the first link.

12. The apparatus of claim 10, wherein the MLD does not contend for the channel on the second link until the packet transmission on the first link has ended, in a situation where the MLD is the intended receiver of packet transmissions on the first link.

13. The apparatus of claim 10, wherein the MLD contending for the channel on the second link, during the recognition time of a packet transmission it detected on the first link, can forbid backoff initialization or backoff re-initialization on the second link during that time.

14. The apparatus of claim 10, wherein the MLD contending for the channel on the second link, during the recognition time of a packet transmission it detected on the first link, only allows continuation of a backoff count-down which was started before the recognition time on the first link.

15. The apparatus of claim 10, wherein the MLD which is not accessing the channel on the second link, at the time its backoff counts down to zero during the packet transmission recognition time on the first link re-initializes its backoff immediately.

16. The apparatus of claim 10, wherein the MLD, which is not accessing the channel on the second link at the time its backoff counts down to zero during the packet transmission recognition time on the first link, waits to re-initialize the backoff until the end of recognition time of the first link.

17. The apparatus of claim 10, wherein the MLD, which is not accessing the channel on the second link at the time its backoff counts down to zero during the packet transmission recognition time on the first link, regards this as an internal collision as defined in the EDCA of IEEE 802.11 for the second link.

18. The apparatus of claim 10, wherein the MLD, which is not accessing the channel on the second link at the time its backoff counts down to zero during the packet transmission recognition time on the first link, reinitiates the backoff counter with Contention-Window (CW) doubled if it does not reach the maximum CW size for the second link.

19. The apparatus of claim 10, wherein the MLD, which is not accessing the channel on the second link when the backoff counts down to zero during the packet transmission recognition time on the first link, is prevented from changing the Contention-Window (CW) on the second link.

20. The apparatus of claim 10, wherein the MLD, which is not accessing the channel on the second link when the backoff counts down to zero during the packet transmission recognition time on the first link, performs resetting the backoff counter on the first link to its value at a beginning time of the detected packet transmission on the first link.

* * * * *